(12) United States Patent
Blossom et al.

(10) Patent No.: US 12,012,524 B2
(45) Date of Patent: Jun. 18, 2024

(54) SILANE TREATED ANHYDROUS KAOLIN AND OTHER MINERALS

(71) Applicant: Burgess Pigment Company, Sandersville, GA (US)

(72) Inventors: George L. Blossom, Macon, GA (US); Ben H. York, Panama City Beach, FL (US)

(73) Assignee: BURGESS PIGMENT COMPANY, Sandersville, GA (US)

( * ) Notice: Subject to any disclaimer, the term of this patent is extended or adjusted under 35 U.S.C. 154(b) by 451 days.

(21) Appl. No.: 16/144,109

(22) Filed: Sep. 27, 2018

(65) Prior Publication Data

US 2019/0352518 A1 Nov. 21, 2019

Related U.S. Application Data

(60) Provisional application No. 62/672,196, filed on May 16, 2018.

(51) Int. Cl.
*C09D 7/62* (2018.01)
*C09C 1/42* (2006.01)
(Continued)

(52) U.S. Cl.
CPC .............. *C09D 7/62* (2018.01); *C09C 1/42* (2013.01); *C09C 3/12* (2013.01); *C09J 11/04* (2013.01);
(Continued)

(58) Field of Classification Search
CPC .. C08K 2003/2241; C08K 3/22; C08K 3/346; C08K 9/06; C09C 1/42; C09C 3/12; C09D 7/62; C09J 11/04
See application file for complete search history.

(56) References Cited

U.S. PATENT DOCUMENTS 5,571,851 A * 11/1996 Freeman .............. C08K 5/5419
523/205
6,369,130 B2 4/2002 Zolotnitsky et al.
(Continued)

FOREIGN PATENT DOCUMENTS

EP 2135852 B1 6/2014
WO 2009059382 A1 5/2009
WO 2017089225 A1 6/2017

OTHER PUBLICATIONS

Google document Dynasylan®—the brand for Functional Silanes (Year: 2017).*
Dynasylan®—the brand for Functional Silanes (Year: 2017).*
Search Report and Written Opinion of corresponding PCT Application No. PCT/US18/53102 dated Dec. 11, 2018.
(Continued)

*Primary Examiner* — Shuangyi Abu Ali
(74) *Attorney, Agent, or Firm* — Hahn Loeser & Parks LLP

(57) ABSTRACT

The present invention in multiple embodiments is directed to amphipathic pigment extenders or fillers comprising silane treated anhydrous kaolin or other minerals that are similarly treated with silane surface modifiers having a cured carbon to nitrogen ratio range of from 9 to 18, and coatings containing the amphipathic pigment extenders or fillers, as well as methods of forming such materials. These surface modified materials are useful in a variety of applications including as pigment extenders or fillers in paints and other coatings with good wetting characteristics, opacity, resistance to staining, resistance to abrasive scrubbing, ability to "self-prime" over porous surfaces, and overall water resistance as well as low to no nuisance dust.

17 Claims, 38 Drawing Sheets

(51) Int. Cl.
  *C09C 3/12* (2006.01)
  *C09J 11/04* (2006.01)
  *C08K 3/22* (2006.01)
  *C08K 9/06* (2006.01)
(52) U.S. Cl.
  CPC ........ *C08K 3/22* (2013.01); *C08K 2003/2241* (2013.01); *C08K 9/06* (2013.01)

(56) References Cited

U.S. PATENT DOCUMENTS

| | | | |
|---|---|---|---|
| 6,808,808 | B2 | 10/2004 | Freeman et al. |
| 2004/0249043 | A1* | 12/2004 | Stoffer .................. C09D 5/084 524/430 |
| 2013/0000518 | A1* | 1/2013 | Raper ..................... C09C 1/405 106/448 |
| 2014/0018439 | A1 | 1/2014 | Gruner et al. |
| 2015/0299540 | A1 | 10/2015 | Schlosser et al. |
| 2016/0304721 | A1 | 10/2016 | Hippmann et al. |
| 2018/0021240 | A1 | 1/2018 | Stein-Hofmann et al. |

OTHER PUBLICATIONS

DiaminosilanSystem Oligomeres et al "?Produktinformation Dynasylan 1146", Aug. 1, 2021 (Aug. 1, 2021) pp. 1-3, XP055882311, [retrieved on Jan. 22, 2022], includes English translation retrieved from https://products-re.evonik.com/www2/uploads/productfinder/Dynasylan-1146-EN.pdf on Feb. 18, 2022, 6 pages.
Extended European Search Report for EP18919130.7 dated Feb. 11, 2022, 7 pages.
Burgess Pigment's Technical Data Sheet for Burgess CB—Surface Modified Calcined Aluminum Silicate, 1 page.
Burgess Pigment's Technical Data Sheet for Burgess 5178—Surface Modified Calcined Aluminum Silicate, 1 page.
Burgess Pigment's Technical Data Sheet for Surface-Modified Anhydrous Aluminum Silicates—Kaolin Clays, Typical Physical Properties, 2 pages.
Examination Report No. 1 for CA3100120 dated Feb. 20, 2024, 6 pages.
Examination Report for EP 18 919 130.7 dated Apr. 26, 2024, 5 pages.

\* cited by examiner

FIG. 7

67 PVC Latex Flat Paint Comparison of Treated Anhydrous Kaolin with Silanes of Varied C / N Ratio
Project 1441-042815

C / N = Carbon / Nitrogen Ratio of Silane Chemistry
All Silanes either Primary Amino Oligomer or Blends of Primary Amino Alkoxy Silane and Alkyl Alkoxy Silane

| | Kaolin Control Untreated | Kaolin Treated (C/N 4) | Kaolin Treated (C/N 9) | Kaolin Treated (C/N 13) | Kaolin Treated (C/N 18) | Kaolin Treated (C/N 24) | PCC Control Untreated | PCC Treated (C/N 9) | Mica Control Untreated | Mica Treated (C/N 9) |
|---|---|---|---|---|---|---|---|---|---|---|
| Water | 525.00 | 525.00 | 525.00 | 525.00 | 525.00 | 525.00 | 525.00 | 525.00 | 525.00 | 525.00 |
| Natrosol 250 HR | 7.00 | 7.00 | 7.00 | 7.00 | 7.00 | 7.00 | 7.00 | 7.00 | 7.00 | 7.00 |
| AMP-95 | 3.00 | 3.00 | 3.00 | 3.00 | 3.00 | 3.00 | 3.00 | 3.00 | 3.00 | 3.00 |
| Nuosept 95 | 1.50 | 1.50 | 1.50 | 1.50 | 1.50 | 1.50 | 1.50 | 1.50 | 1.50 | 1.50 |
| Tamol 731 | 6.00 | 6.00 | 6.00 | 6.00 | 6.00 | 6.00 | 6.00 | 6.00 | 6.00 | 6.00 |
| KTPP | 1.00 | 1.00 | 1.00 | 1.00 | 1.00 | 1.00 | 1.00 | 1.00 | 1.00 | 1.00 |
| Igepal CO-630 | 3.00 | 3.00 | 3.00 | 3.00 | 3.00 | 3.00 | 3.00 | 3.00 | 3.00 | 3.00 |
| Rhodoline 643 | 4.00 | 4.00 | 4.00 | 4.00 | 4.00 | 4.00 | 4.00 | 4.00 | 4.00 | 4.00 |
| Ti-Pure R-900 | 75.00 | 75.00 | 75.00 | 75.00 | 75.00 | 75.00 | 75.00 | 75.00 | 75.00 | 75.00 |
| Anhydrous Kaolin Untreated | 200.00 | --- | --- | --- | --- | --- | --- | --- | --- | --- |
| Anhydrous Kaolin Silane Treated (C / N = 4) | --- | 200.00 | --- | --- | --- | --- | --- | --- | --- | --- |
| Anhydrous Kaolin Silane Treated (C / N = 9) | --- | --- | 200.00 | --- | --- | --- | --- | --- | --- | --- |
| Anhydrous Kaolin Silane Treated (C / N = 13) | --- | --- | --- | 200.00 | --- | --- | --- | --- | --- | --- |
| Anhydrous Kaolin Silane Treated (C / N = 18) | --- | --- | --- | --- | 200.00 | --- | --- | --- | --- | --- |
| Anhydrous Kaolin Silane Treated (C / N = 24) | --- | --- | --- | --- | --- | 200.00 | --- | --- | --- | --- |
| Precipitated Calcium Carbonate Untreated | --- | --- | --- | --- | --- | --- | 200.00 | --- | --- | --- |
| Precipitated Calcium Carbonate (C / N = 9) | --- | --- | --- | --- | --- | --- | --- | 200.00 | --- | --- |
| Mica Untreated | --- | --- | --- | --- | --- | --- | --- | --- | 200.00 | --- |
| Mica (C / N = 9) | --- | --- | --- | --- | --- | --- | --- | --- | --- | 200.00 |
| Calwhite | 150.00 | 150.00 | 150.00 | 150.00 | 150.00 | 150.00 | 150.00 | 150.00 | 150.00 | 150.00 |
| Texanol | 12.00 | 12.00 | 12.00 | 12.00 | 12.00 | 12.00 | 12.00 | 12.00 | 12.00 | 12.00 |
| Propylene Glycol | 5.00 | 5.00 | 5.00 | 5.00 | 5.00 | 5.00 | 5.00 | 5.00 | 5.00 | 5.00 |
| Encor 379G | 125.00 | 125.00 | 125.00 | 125.00 | 125.00 | 125.00 | 125.00 | 125.00 | 125.00 | 125.00 |
| Key Performance Properties: | | | | | | | | | | |
| Incorporation, 1 - 10 Rating | 10 | 10 | 10 | 10 | 8 | 1 - Fail | 10 | 10 | 10 | 10 |
| Dusting Resistance, 1 - 10 Rating | 10 | 10 | 10 | 10 | 9 | 7 | 9 | 8 | 8 | 7 |
| Nigrosine Dye (2%) Stain Resistance | 1 | 1 | 5 | 5 | 5 | N/A | | | | |
| Abraisive Scrub Resistance, ASTM D2486 | 46 Cycles | 71 Cycles | 80 Cycles | 76 Cycles | 79 Cycles | N/A | 76 Cycles | 187 Cycles | 73 Cycles | 120 Cycles |
| Water Uptake of Dry Films (Hydrophobicity) | 14.4% | 15.1% | 11.3% | 11.0% | 11.3% | N/A | 13.6% | 9.5% | 13.9% | 11.0% |
| Water Beading of Dry Films (Surface Energy) | 1 | 1 | 7 | 7 | 8 | N/A | 1 | 7 | 1 | 2 |

Rating: 1 = Poor ; 10 = Excellent

FIG. 9

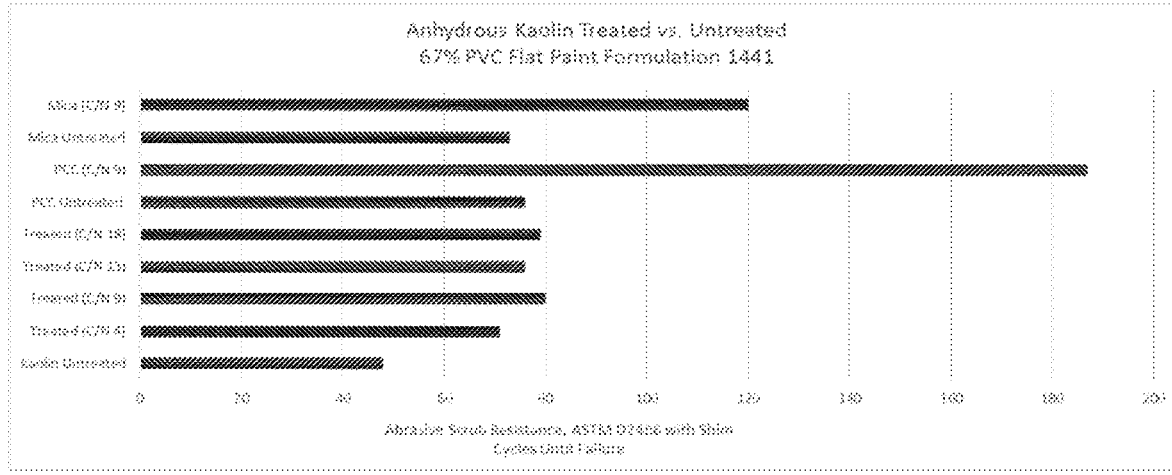
FIG. 10
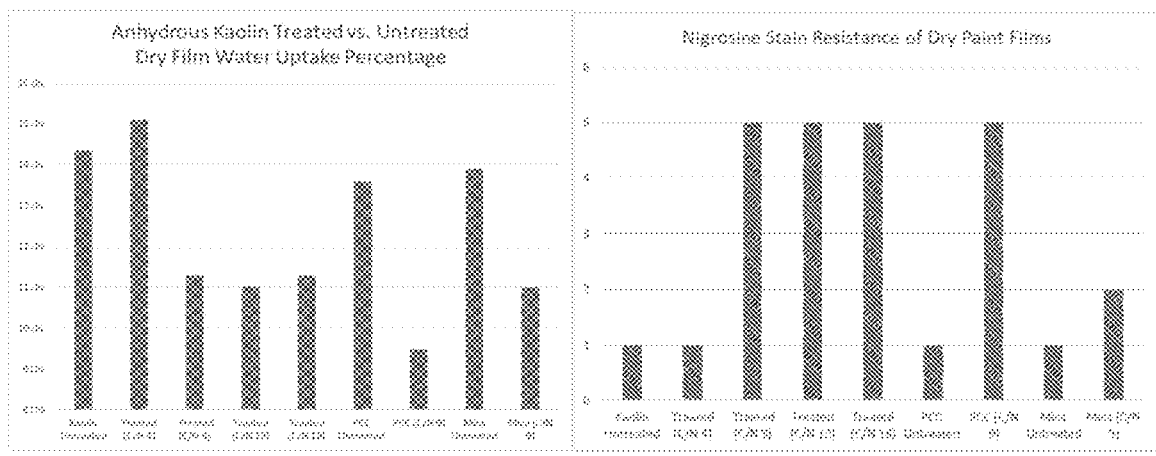
FIG. 11
FIG. 12

67% PVC Architectural Flat Formulation 1441 (Series 1) / Treated Kaolin Dosage Study

| Ingredient | No Silane<br>Calcined Kaolin<br>Blank Control<br>A | (1% Total Silane)<br>0.67% OCT<br>0.33% AMEO<br>B | (1.5% Total Silane)<br>1.0% OCT<br>0.50% AMEO<br>C | (2% Total Silane)<br>1.34% OCT<br>0.66% AMEO<br>D | (2.5% Total Silane)<br>1.67% OCT<br>0.83% AMEO<br>E |
|---|---|---|---|---|---|
| Water | 525.00 | 525.00 | 525.00 | 525.00 | 525.00 |
| Rhodoline 643 | 4.00 | 4.00 | 4.00 | 4.00 | 4.00 |
| Natrasol 250HR | 7.00 | 7.00 | 7.00 | 7.00 | 7.00 |
| AMP-95 | 3.00 | 3.00 | 3.00 | 3.00 | 3.00 |
| Nuosept 95 | 1.50 | 1.50 | 1.50 | 1.50 | 1.50 |
| KTPP | 1.00 | 1.00 | 1.00 | 1.00 | 1.00 |
| Tamol 731A | 6.00 | 6.00 | 6.00 | 6.00 | 6.00 |
| Igepal CO 630 | 3.00 | 3.00 | 3.00 | 3.00 | 3.00 |
| Ti-Pure R900 | 75.00 | 75.00 | 75.00 | 75.00 | 75.00 |
| Calcined Kaolin Untreated Control | 200.00 | --------- | --------- | --------- | --------- |
| Calcined Kaolin (1.0% OCT/AMEO) | --------- | 200.00 | --------- | --------- | --------- |
| Calcined Kaolin (1.5% OCT/AMEO) | --------- | --------- | 200.00 | --------- | --------- |
| Calcined Kaolin (2.0% OCT/AMEO) | --------- | --------- | --------- | 200.00 | --------- |
| Calcined Kaolin (2.5% OCT/AMEO) | --------- | --------- | --------- | --------- | 200.00 |
| Calwhite | 150.00 | 150.00 | 150.00 | 150.00 | 150.00 |
| Texanol | 12.00 | 12.00 | 12.00 | 12.00 | 12.00 |
| Propylene Glycol | 5.00 | 5.00 | 5.00 | 5.00 | 5.00 |
| Encor 379G | 125.00 | 125.00 | 125.00 | 125.00 | 125.00 |
| Totals: | 1117.50 | 1117.50 | 1117.50 | 1117.50 | 1117.50 |

Theoretical Physical Properties ⟶ Pigment Volume Concentration (PVC) = 67.3%   Specific Gravity, g/ml = 1.34
Volume Solids Percent = 26.8%   Volitile Organic Content = 73 g/L
Weight Solids Percent = 45.6%   Pigment / Binder Ratio = 5.04
Density, Lb / Gallon = 11.19

Fig. 13

| RESULTS | Untreated | OCT/AMEO 1.0% | OCT/AMEO 1.5% | OCT/AMEO 2.0% | OCT/AMEO 2.5% |
|---|---|---|---|---|---|
| | A | B | C | D | E |
| Reflectance | 92.70% | 92.30% | 92.40% | 92.30% | 92.50% |
| Contrast Ratio | 97.80% | 97.70% | 97.60% | 98.00% | 97.40% |
| Stain Resistance using 2% Nigrosine Dye | 1 | 3 | 5 | 5 | 5 |
| Scrub Resistance | 43 | 78 | 78 | 72 | 77 |
| Water Absorption, Percent | 17.60% | 13.40% | 13.30% | 12.80% | 12.90% |
| 85 Deg Sheen | 3.2 | 4.4 | 4.1 | 4.9 | 3.8 |
| 60 Deg Sheen | 2.2 | 2.3 | 2.3 | 2.4 | 2.3 |
| Stormer Viscosity, 24 hours | 95 KU | 97 KU | 101 KU | 102 KU | 101 KU |
| Coloremetric Data | | | | | |
| L | 97.06 | 96.9 | 96.97 | 96.9 | 96.95 |
| a | -0.63 | -0.71 | -0.72 | -0.73 | -0.69 |
| b | 1.72 | 1.76 | 1.77 | 1.78 | 1.77 |
| Resistance to Dusting Upon Incorporation | 10 | 9 | 9 | 8 | 8 |
| Ease of Dispersion in Grind Phase | 10 | 10 | 10 | 8 | 7 |
FIG. 14
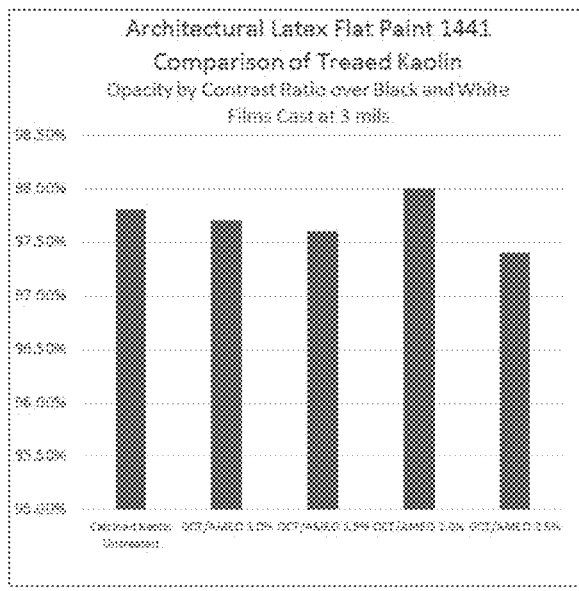
FIG. 15
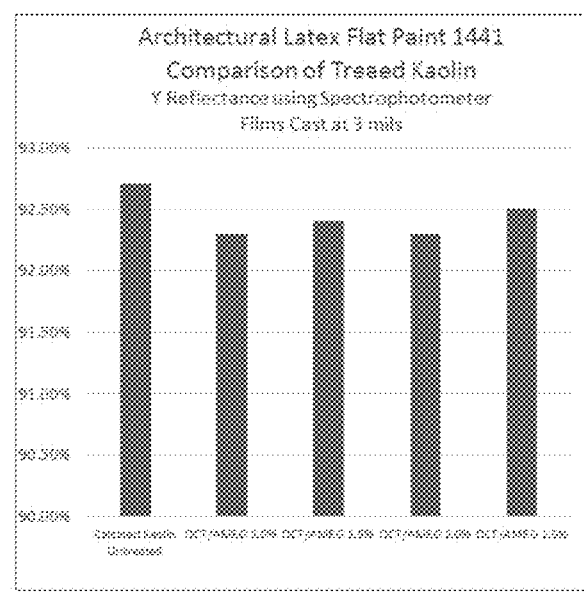
FIG. 16

67% PVC Architectural Flat with Encor 379G Vinyl Latex and Treated Kaolin Dosage Study
(Silane Percentage based on Weight Parts of Calcined Kaolin Clay)

| Ingredient | (No Silane) Untreated Kaolin Blank Control | Series 1 (1% Total Silane) Untreated 0.67% OCT 0.33% AMEO | (1.5% Total Silane) Untreated 1.0% OCT 0.50% AMEO | (2% Total Silane) Untreated 1.33% OCT 0.66% AMEO | (2.5% Total Silane) Untreated 1.67% OCT 0.83% AMEO | (1% Total Silane) Kaolin Treated 0.67% OCT 0.33% AMEO | Series 2 (1.5% Total Silane) Kaolin Treated 1.0% OCT 0.50% AMEO | (2% Total Silane) Kaolin Treated 1.33% OCT 0.66% AMEO | (2.5% Total Silane) Kaolin Treated 1.67% OCT 0.83% AMEO |
|---|---|---|---|---|---|---|---|---|---|
| Water | 525.00 | 525.00 | 525.00 | 525.00 | 525.00 | 525.00 | 525.00 | 525.00 | 525.00 |
| Rhodoline 643 | 4.00 | 4.00 | 4.00 | 4.00 | 4.00 | 4.00 | 4.00 | 4.00 | 4.00 |
| Natrosol 250HR | 7.00 | 7.00 | 7.00 | 7.00 | 7.00 | 7.00 | 7.00 | 7.00 | 7.00 |
| AMP-95 | 3.00 | 3.00 | 3.00 | 3.00 | 3.00 | 3.00 | 3.00 | 3.00 | 3.00 |
| Nuosept 95 | 1.50 | 1.50 | 1.50 | 1.50 | 1.50 | 1.50 | 1.50 | 1.50 | 1.50 |
| KTPP | 1.00 | 1.00 | 1.00 | 1.00 | 1.00 | 1.00 | 1.00 | 1.00 | 1.00 |
| Tamol 731A | 6.00 | 6.00 | 6.00 | 6.00 | 6.00 | 6.00 | 6.00 | 6.00 | 6.00 |
| Igepal CO-630 | 3.00 | 3.00 | 3.00 | 3.00 | 3.00 | 3.00 | 3.00 | 3.00 | 3.00 |
| Ti-Pure R900 | 75.00 | 75.00 | 75.00 | 75.00 | 75.00 | 75.00 | 75.00 | 75.00 | 75.00 |
| Untreated Kaolin | 200.00 | 200.00 | 200.00 | 200.00 | 200.00 | | | | |
| Treated Kaolin (1.0% OCT/AMEO) | | | | | | 200.00 | | | |
| Treated Kaolin (1.5% OCT/AMEO) | | | | | | | 200.00 | | |
| Treated Kaolin (2.0% OCT/AMEO) | | | | | | | | 200.00 | |
| Treated Kaolin (2.5% OCT/AMEO) | | | | | | | | | 200.00 |
| Calwhite | 150.00 | 150.00 | 150.00 | 150.00 | 150.00 | 150.00 | 150.00 | 150.00 | 150.00 |
| Texanol | 12.00 | 12.00 | 12.00 | 12.00 | 12.00 | 12.00 | 12.00 | 12.00 | 12.00 |
| Propylene Glycol | 5.00 | 5.00 | 5.00 | 5.00 | 5.00 | 5.00 | 5.00 | 5.00 | 5.00 |
| Encor 379G Vinyl Latex | 125.00 | 125.00 | 125.00 | 125.00 | 125.00 | 125.00 | 125.00 | 125.00 | 125.00 |
| Octyl Triethoxysilane (OCTEO) | | 1.34 | 2.00 | 2.68 | 3.34 | | | | |
| Aminoethyl Triethoxysilane (AMEO) | | 0.66 | 1.00 | 1.32 | 1.66 | | | | |
| Totals | 1117.50 | 1119.50 | 1120.50 | 1121.50 | 1122.50 | 1117.50 | 1117.50 | 1117.50 | 1117.50 |

Theoretical Physical Properties  ▼Pigment Volume Concentration (PVC) = 67.3%
Volume Solids Percent = 26.8%
Weight Solids Percent = 45.6%
Density, lb / Gallon = 11.19

Specific Gravity, g/ml = 1.34
Volitile Organic Content = 73 g/L
Pigment / Binder Ratio = 5.04

Fig. 22

Acrylic Elastomeric Roof Coating Formulation 1509 / Treated Kaolin Dosage Study

| Ingredient | No Silane / No Kaolin Blank Control / A | No Silane / Kaolin Untreated Control / B | OCTEO / AMEO 1% Total Silane / C | OCTEO / AMEO 1.5% Total Silane / D | OCTEO / AMEO 2% Total Silane / E |
|---|---|---|---|---|---|
| Water | 191.50 | 191.50 | 191.50 | 191.50 | 191.50 |
| Natrosol 250 HR | 3.00 | 3.00 | 3.00 | 3.00 | 3.00 |
| Nopco NXZ | 4.00 | 4.00 | 4.00 | 4.00 | 4.00 |
| Acticide MBS | 1.50 | 1.50 | 1.50 | 1.50 | 1.50 |
| Tamol 731 | 8.00 | 8.00 | 8.00 | 8.00 | 8.00 |
| KTPP | 1.00 | 1.00 | 1.00 | 1.00 | 1.00 |
| Igepal CO 630 | 2.00 | 2.00 | 2.00 | 2.00 | 2.00 |
| Ti-Pure R-706 | 75.00 | 75.00 | 75.00 | 75.00 | 75.00 |
| Zinc Oxide, EPM-E | 12.50 | 12.50 | 12.50 | 12.50 | 12.50 |
| Calcined Kaolin Untreated Control | --- | 100.00 | --- | --- | --- |
| Calcined Kaolin (1.0% OCT/AMEO) | --- | --- | 100.00 | --- | --- |
| Calcined Kaolin (1.5% OCT/AMEO) | --- | --- | --- | 100.00 | --- |
| Calcined Kaolin (2.0% OCT/AMEO) | --- | --- | --- | --- | 100.00 |
| Omyacarb 10 | 376.00 | 276.00 | 276.00 | 276.00 | 276.00 |
| Nopco NXZ | 4.00 | 4.00 | 4.00 | 4.00 | 4.00 |
| Optifilm 400 | 2.00 | 2.00 | 2.00 | 2.00 | 2.00 |
| RHOPLEX EC-1791 | 475.00 | 475.00 | 475.00 | 475.00 | 475.00 |
| Polyphase 663 | 10.00 | 10.00 | 10.00 | 10.00 | 10.00 |
| Natrosol 250 HR | 3.00 | 3.00 | 3.00 | 3.00 | 3.00 |
| Propylene Glycol | 12.00 | 12.00 | 12.00 | 12.00 | 12.00 |
| Totals | 1179.50 | 1179.50 | 1179.50 | 1179.50 | 1179.50 |

Theoretical Physical Properties → Pigment Volume Concentration (PVC) = 37.3%  Specific Gravity, g/ml = 1.38
Volume Solids Percent = 31.5%   Volatile Organic Content = 29 g/L
Weight Solids Percent = 64.0%   Pigment / Binder Ratio = 1.58
Density, Lb / Gallon = 11.51

FIG. 26

| RESULTS | Wet Knife Blank Control | Optimal Knife Untreated | OCT/AMEO 1.0% | OCT/AMEO 1.5% | OCT/AMEO 2.0% |
|---|---|---|---|---|---|
| Contrast Ratio | 4 | 0 | 0 | 0 | 0 |
| Y Reflectance | 90.00% | 90.90% | 90.80% | 90.70% | 90.60% |
|  | 88.70% | 88.80% | 88.70% | 88.70% | 88.80% |
| 85° Sheen | 1.1 | 1.3 | 1.4 | 1.5 | 1.5 |
| 60° Sheen | 3 | 3 | 3 | 3.1 | 3.2 |
| Viscosity | 115 KU | 111 KU | 116 KU | 118 KU | 116 KU |
| Density, Lb/Gal | 11.53 | 11.75 | 11.65 | 11.45 | 11.35 |
| L | 95.42 | 95.44 | 95.41 | 95.46 | 95.45 |
| A | -0.8 | -0.87 | -0.9 | -0.9 | -0.93 |
| B | 1.97 | 2.23 | 2.4 | 2.43 | 2.4 |
| Water Absorption % | 6.25% | 5.92% | 5.00% | 5.10% | 4.80% |
| % Change in Water Absorption | Control | 5% | 20% | 18.40% | 23.20% |
| Stain Resistance, Brown Iron Oxide Slurry, Y Reflectance after Staining | 21.2 | 18.6 | 58.4 | 74.8 | 79.2 |
| Elongation % | 320.00% | 302.00% | 346.00% | 285.00% | 330.00% |
| Tensile, PSI | 341 | 410 | 404 | 302 | 272 |
| Modulus @ 100% | 260.54 | 355.94 | 330.84 | 287.9 | 257.82 |
| Modulus @ 200% | 330.61 | 438.59 | 400.75 | 350.44 | 317.11 |
| Modulus @ 300% | 363.31 | 464.24 | 420.82 | 385.02 | 334.86 |

FIG. 27

High Performance Architectural Coating 1513 - Treated Kaolin Optimization Study

| Ingredient | No Silane<br>Untreated<br>Kaolin Control<br>A | (1.5% Silane)<br>1.0% OCT<br>0.50% AMEO<br>B | (2% Silane)<br>1.33% OCT<br>0.67% AMEO<br>C | (-20% TiO$_2$)<br>No Silane<br>Untreated<br>Kaolin Control<br>D | (-20% TiO$_2$)<br>(1.5% Silane)<br>1.0% OCT<br>0.50% AMEO<br>E | (-20% TiO$_2$)<br>(2% Silane)<br>1.33% OCT<br>0.67% AMEO<br>F |
|---|---|---|---|---|---|---|
| Water | 360.00 | 360.00 | 360.00 | 360.00 | 360.00 | 360.00 |
| Natrosol 250 HR | 3.50 | 3.50 | 3.50 | 3.50 | 3.50 | 3.50 |
| Ammonia 26° | 1.50 | 1.50 | 1.50 | 1.50 | 1.50 | 1.50 |
| Acticide MBS | 2.00 | 2.00 | 2.00 | 2.00 | 2.00 | 2.00 |
| KTPP | 1.00 | 1.00 | 1.00 | 1.00 | 1.00 | 1.00 |
| Tamol 731A | 7.80 | 7.80 | 7.80 | 7.80 | 7.80 | 7.80 |
| Igepal CO-630 | 2.00 | 2.00 | 2.00 | 2.00 | 2.00 | 2.00 |
| Rhodoline 643 | 2.00 | 2.00 | 2.00 | 2.00 | 2.00 | 2.00 |
| Ti-Pure R-900 | 300.00 | 300.00 | 300.00 | 240.00 | 240.00 | 240.00 |
| Calcined Kaolin Untreated Control | 100.00 | --------- | --------- | 150.00 | --------- | --------- |
| Calcined Kaolin (1.5% OCT/AMEO) | --------- | 100.00 | --------- | --------- | 150.00 | --------- |
| Calcined Kaolin (2.0% OCT/AMEO) | --------- | --------- | 100.00 | --------- | --------- | 150.00 |
| Minex 4 | 150.00 | 150.00 | 150.00 | 150.00 | 150.00 | 150.00 |
| Texanol | 2.20 | 2.20 | 2.20 | 2.20 | 2.20 | 2.20 |
| Propylene Glycol | 5.00 | 5.00 | 5.00 | 5.00 | 5.00 | 5.00 |
| Rhoplex VSR-2015 | 235.00 | 235.00 | 235.00 | 235.00 | 235.00 | 235.00 |
| Rhodoline 643 | 2.00 | 2.00 | 2.00 | 2.00 | 2.00 | 2.00 |
| Triton X-405 | 1.50 | 1.50 | 1.50 | 1.50 | 1.50 | 1.50 |
| Acrysol RM-5000 | 15.00 | 15.00 | 15.00 | 15.00 | 15.00 | 15.00 |
| Water | 33.00 | 33.00 | 33.00 | 33.00 | 33.00 | 33.00 |
| Totals: | 1223.50 | 1223.50 | 1223.50 | 1213.50 | 1213.50 | 1213.50 |
| Theoretical Physical Properties: | | | | | | |
| Pigment Volume Concentration (PVC) | 58.20% | 58.20% | 58.20% | 58.70% | 58.70% | 58.70% |
| Volume Solids Percent | 35.40% | 35.40% | 35.40% | 35.70% | 35.70% | 35.70% |
| Weight Solids Percent | 56.00% | 56.00% | 56.00% | 55.60% | 55.60% | 55.60% |
| Density, Lb / Gallon | 12.3 | 12.3 | 12.3 | 11.62 | 11.62 | 11.62 |
| V.O.C. Content, g/L | 32 | 32 | 32 | 32 | 32 | 32 |

FIG. 38

Results:

| | Calcined Kaolin Untreated A | OCTIAMEO 1.5% B | OCTIAMEO 2.0% C | Calcined Kaolin Untreated D | OCTIAMEO 1.5% E | OCTIAMEO 2.0% F |
|---|---|---|---|---|---|---|
| Reflectance | 92.90% | 92.40% | 92.60% | 93.10% | 92.50% | 92.60% |
| Contrast Ratio | 98.50% | 98.10% | 97.80% | 98.60% | 98.30% | 98.10% |
| Stain Resistance using 2% Nigrosine Dye | 2 | 7 | 7 | 1 | 7 | 7 |
| Scrub Resistance | 302 | 343 | 338 | 242 | 340 | 342 |
| 85 Deg Sheen | 2.1 | 2.1 | 2.2 | 2.2 | 2.5 | 2.4 |
| 60 Deg Sheen | 2.3 | 2.3 | 2.4 | 2.2 | 2.3 | 2.3 |
| Stormer Viscosity, 24 hours | 104 | 103 | 105 | 104 | 104 | 105 |
| Colorimetric Data | | | | | | |
| L | 97.18 | 96.95 | 97.03 | 97.22 | 96.97 | 96.97 |
| a | -0.89 | -0.87 | -0.91 | -0.87 | -0.86 | -0.91 |
| b | 1.66 | 1.69 | 1.77 | 1.86 | 1.86 | 1.83 |

FIG. 39

| 63% PVC Architectural Flat Formulation 1511 / Treated Kaolin Dosage Study | | | | | | | |
|---|---|---|---|---|---|---|---|
| Formulas Displayed in Wt. Units | | | | | | | |
| | No Silane | (1% Total Silane) | (1.5% Total Silane) | (2% Total Silane) | (2.5% Total Silane) | (1% Total Silane) | (1.5% Total Silane) |
| Ingredient | Calcined Kaolin Blank Control | 0.67% OCT 0.33% AMEO | 1.0% OCT 0.50% AMEO | 1.34% OCT 0.66% AMEO | 1.67% OCT 0.83% AMEO | 1.0% VTEO | 1.5% Oligomeric Amino |
| | A | B | C | D | E | F | G |
| Water | 347.00 | 347.00 | 347.00 | 347.00 | 347.00 | 347.00 | 347.00 |
| Rhodoline 643 | 2.00 | 2.00 | 2.00 | 2.00 | 2.00 | 2.00 | 2.00 |
| Natrasol 250HR | 3.50 | 3.50 | 3.50 | 3.50 | 3.50 | 3.50 | 3.50 |
| Ammonia | 1.80 | 1.80 | 1.80 | 1.80 | 1.80 | 1.80 | 1.80 |
| Acticide MBS | 2.00 | 2.00 | 2.00 | 2.00 | 2.00 | 2.00 | 2.00 |
| KTPP | 1.00 | 1.00 | 1.00 | 1.00 | 1.00 | 1.00 | 1.00 |
| Tamol 731A | 7.80 | 7.80 | 7.80 | 7.80 | 7.80 | 7.80 | 7.80 |
| Igepal CO 630 | 2.00 | 2.00 | 2.00 | 2.00 | 2.00 | 2.00 | 2.00 |
| Ti-Pure R900 | 200.00 | 200.00 | 200.00 | 200.00 | 200.00 | 200.00 | 200.00 |
| Calcined Kaolin Untreated Control | 200.00 | — | — | — | — | — | — |
| Calcined Kaolin (1.0% OCT/AMEO) | — | 200.00 | — | — | — | — | — |
| Calcined Kaolin (1.5% OCT/AMEO) | — | — | 200.00 | — | — | — | — |
| Calcined Kaolin (2.0% OCT/AMEO) | — | — | — | 200.00 | — | — | — |
| Calcined Kaolin (2.5% OCT/AMEO) | — | — | — | — | 200.00 | — | — |
| Calcined Kaolin (1.0% VTEO) | — | — | — | — | — | 200.00 | — |
| Calcined Kaolin (1.5% Amino Oligome) | — | — | — | — | — | — | 200.00 |
| Minex 4 | 200.00 | 200.00 | 200.00 | 200.00 | 200.00 | 200.00 | 200.00 |
| Attagel 50 | 4.00 | 4.00 | 4.00 | 4.00 | 4.00 | 4.00 | 4.00 |
| Texanol | 2.20 | 2.20 | 2.20 | 2.20 | 2.20 | 2.20 | 2.20 |
| Propylene Glycol | 5.00 | 5.00 | 5.00 | 5.00 | 5.00 | 5.00 | 5.00 |
| Triton X-405 | 1.50 | 1.50 | 1.50 | 1.50 | 1.50 | 1.50 | 1.50 |
| Rhodoline 643 | 2.00 | 2.00 | 2.00 | 2.00 | 2.00 | 2.00 | 2.00 |
| RHOPLEX VSR-2015 | 235.00 | 235.00 | 235.00 | 235.00 | 235.00 | 235.00 | 235.00 |
| Acrysol RM-8.24 | 5.00 | 5.00 | 5.00 | 5.00 | 5.00 | 5.00 | 5.00 |
| Water | 33.00 | 33.00 | 33.00 | 33.00 | 33.00 | 33.00 | 33.00 |
| Totals: | 1254.80 | 1254.80 | 1254.80 | 1254.80 | 1254.80 | 1254.80 | 1254.80 |

Theoretical Physical Properties → Pigment Volume Concentration (PVC) = 63.1%   Specific Gravity, g/ml = 1.49
Volume Solids Percent = 38.5%   Volitile Organic Content = 33 g/L
Weight Solids Percent = 58.6%   Pigment / Binder Ratio = 4.60
Density, lb / Gallon = 12.43

FIG. 44

| RESULTS | Calcined Kaolin Untreated | OCTAMEO 1.0% | OCTAMEO 1.5% | OCTAMEO 2.0% | OCTAMEO 2.5% | VTEO 1.0% | Amino Oligomer 1.5% |
|---|---|---|---|---|---|---|---|
| | A | B | C | D | E | F | G |
| Reflectance | 93.40% | 93.00% | 93.00% | 93.10% | 93.00% | 93.20% | 93.10% |
| Contrast Ratio | 99.30% | 98.70% | 98.90% | 98.90% | 98.80% | 99.00% | 99.20% |
| Stain Resistance using 2% Nigrosine Dye | 1 | 3 | 5 | 5 | 8 | 2 | 5 |
| Scrub Resistance | 212 | 328 | 343 | 364 | 333 | 349 | 277 |
| Water Absorption, Percent | 12.24% | 8.85% | 9.02% | 8.67% | 9.07% | 9.22% | 9.45% |
| 85 Deg Sheen | 2.60% | 3.20% | 3.30% | 3.40% | 3.10% | 3.10% | 2.90% |
| 60 Deg Sheen | 2.30% | 2.40% | 2.40% | 2.40% | 2.40% | 2.30% | 2.30% |
| Stormer Viscosity, 24 hours | 108 KU | 110 KU | 114 KU | 110 KU | 107 KU | 111 KU | 104 KU |
| Colorimetric Data | | | | | | | |
| L | 97.44% | 97.22% | 97.20% | 97.19% | 97.18% | 97.25% | 97.22% |
| a | -0.75 | -0.81 | -0.81 | -0.84 | -0.83 | -0.78 | -0.81 |
| b | 1.90 | 2.06 | 2.03 | 2.07 | 1.98 | 1.97 | 1.87 |
| Resistance to Dusting Upon Incorporation | 10 | 9 | 9 | 8 | 8 | 1 | 6 |
| Ease of Dispersion in Grind Phase | 10 | 10 | 10 | 8 | 7 | 4 | 6 |

FIG. 45

SILANE TREATED ANHYDROUS KAOLIN AND OTHER MINERALS

This patent application claims priority to U.S. Provisional Application No. 62/672,196, filed May 16, 2018, and is incorporated herein by reference.

FIELD

Silane treated anhydrous kaolin clays and other minerals used to enhance performance in paints, coatings, pigment concentrates, and other aqueous and non-aqueous compositions.

BACKGROUND

The demand for high-performing architectural and commercial coatings is being driven by many factors within the Paint and Coatings Industry. For instance, some engineering firms require coatings such as paints that are to be used in commercial settings to meet the rigid performance specifications set forth by institutions such as Master Painter's Institute (MPI), ASTM International, the Cool Roof Rating Council, and others. High performance architectural paints are evaluated with respect to a number of performance properties including opacity, resistance to staining, resistance to abrasive scrubbing, ability to "self-prime" over porous surfaces, and overall water resistance.

Adjusting the type of binder that is used in a coating is one of the strategies that has been utilized to try to meet these increasingly demanding performance specifications. Deciding which type of binder to use in a coating is significant as the binder protects and encapsulates pigments and fillers that may be present in the coating, while offering adhesion to surfaces. However, the binder itself while improving some coating properties also can degrade or impart other undesirable properties to the coating. For example, emulsified latex is one type of binder that is used in paints and other coatings. Emulsified latex can differ in polymeric form and can, for example, be hard, soft, or elastic, depending upon the end-use application. These latex polymers include thermoplastic and film formers that are dependent upon temperature. Harder polymers typically require a slow evaporating solvent to coalesce the film at ambient temperature. These coalescing solvents contribute to the volatile organic content or V.O.C., which is regulated by the U.S. and foreign governments and enforced with strict limits. Environmental regulations and the need for Low V.O.C. coatings has given rise to the development of softer latex polymers requiring little to no coalescent to form a film at room temperature. However, such softer binder technologies can result in premature failure under abrasion or "low scrub resistance."

Another issue with latex technologies is that because synthesis occurs within a surfactant micelle, the high surfactant content in the final emulsion can result in water sensitivity. These hydrophilic binders and surfactants can allow water penetration into the dry coating film resulting in swelling. As this continues, the water eventually intrudes behind the film itself where it can become trapped between the film and the substrate. The absorption of water into a coating can be extremely detrimental, giving rise to early blistering and peeling, leaching of surfactants onto the surface, early fungal and algal contamination, and damage to the underlying substrate that the film is struggling to protect. This phenomenon can occur with waterborne coatings both interior and exterior, but is especially problematic with elastomeric liquid applied horizontally in roof coatings, where water can pond on the surface for extended periods after rain showers. Water penetration through the protective coating can enter the cavities of wall elevations, causing severe damage to the building. The increased water swell also can attract microorganisms, which feed off the carbon in the coating, eventually breaking down and degrading the film.

Elastomeric roof coatings are another example. Because elastomeric roof coatings also are produced with soft, flexible latex binders, dirt "pick-up" or "soiling" can occur over time leading to further degradation from microorganisms. Moreover, as roofs and walls become darker from soiling, more infrared radiation is absorbed rather than reflected, which contributes to what is termed "heat island effect." This heat island essentially creates a heat blanket around highly populated urban cities that is believed to destroy atmospheric ozone, while at the same time contributing to warmer air temperatures.

In addition to binders, Kaolin clays and other minerals such as, for example, diatomaceous earth, silica, quartz, hydrous aluminum silicate, anhydrous aluminum silicate, synthetic silicates, inorganic oxides (e.g. $Fe_2O_3$, $ZnO$, $TiO_2$, $Cr_2O_3$), wollastonite, calcium carbonate either dry ground or precipitated, mica, gypsum, barytes, carbon black, talc, nepheline syenite, and attapulgite, among others are minerals used in some paints and coatings as pigments, pigment extenders and fillers. For example, flash calcined kaolin clays offer excellent opacity and matting. However, performance driven architectural paints and commercial roof coatings typically contain low to no levels of calcined clay because such materials tend to degrade certain performance properties of the coating. For example, one of the drawbacks of using such materials is that when clays are dehydroxylated, absorbency of the minerals increases, which directly correlates to increased binder demand, thereby diminishing the film's mechanical properties, stain repellency, and water repellency.

SUMMARY

The present invention in multiple embodiments is directed to silane treated anhydrous kaolin and other minerals including diatomaceous earth, silica, quartz, hydrous aluminum silicate, synthetic silicates, inorganic oxides (e.g. $Fe_2O_3$, $ZnO$, $TiO_2$, $Cr_2O_3$), wollastonite, calcium carbonate either dry ground or precipitated, mica, gypsum, barytes, carbon black, talc, nepheline syenite, attapulgite and compositions containing these silane treated materials, as well as methods of forming these materials and compositions. Such materials are useful in a variety of applications including as multifunctional pigment extenders and fillers in water based and non-water based paints and other coatings with good wetting and low to no nuisance dust and also can be used in solvent based coatings, including epoxies and adhesive products. These materials combine opacity with other beneficial attributes such as abrasive scrub resistance, stain resistance, resistance to soiling, inhibition of dry film water absorption, surface hydrophobicity demonstrated by higher contact angle, and reduced porosity for self-priming applications. These silane treated materials also can help offset at least some of the potentially detrimental properties imparted by certain soft latex binders such as low scrub resistance and dirt pickup, and additionally might function as a non-volatile film forming agent that aids in the coalescence of latex polymers, which could allow for a reduction in the coating's volatile organic content.

The embodiments described herein include anhydrous kaolin that has been chemically modified with a primary amino silane oligomer, preferably a primary diamino silane oligomer, or a stable blend of alkyl alkoxy silane and primary amino alkyl alkoxy silane, preferably a blend of alkyltrialkoxysilane and primary aminoalkyltrialkoxysilane, having a cured carbon to nitrogen ratio (C/N) of 9 to 18 in an amount sufficient to render the chemically modified kaolin amphipathic. As used herein the term "primary amino silane oligomer" may include oligomers containing a single amino group or multiple amino groups, including primary diamino silane oligomers, so long as at least one amino group is located at a terminal end of the oligomer. The primary amino silane oligomers can comprise for example Evonik 1146 (from Evonik Industries AG) or JH-AP-1231 (from Jianghan Fine Chemicals), which are primary diamino silane oligomers. The blend of alkyltrialkoxysilane and primary amino alkyltrialkoxysilane can comprise for example a blend of octyltriethoxysilane and aminopropyltriethoxysilane. The kaolin is treated with the primary diamino silane oligomer or blends of alkyltrialkoxy and primary amino alkyltrialkoxysilane in concentrations ranging from about 1%-5%, preferably 1%-2.5%, for example in concentrations such as 1.0%, 1.5%, 2.0%, or 2.5%. The kaolin can have a density of 2.2 g/cc to 2.8 g/cc, and an average particle size of 0.1-5.0 μm.

Also disclosed is a pigment extender for a paint or other coating comprising a mineral selected from the group consisting of diatomaceous earth, silica, quartz, hydrous and anhydrous aluminum silicate (kaolin), synthetic silicates, inorganic oxides (e.g. $Fe_2O_3$, ZnO, $TiO_2$, $Cr_2O_3$), wollastonite, calcium carbonate either dry ground or precipitated, mica, gypsum, barytes, carbon black and combinations thereof that has been chemically modified with a primary diamino silane oligomer or a blend of alkyltrialkoxy and primary aminoalkyltrialkoxy silanes having a cured carbon to nitrogen ratio (C/N) of 9 to 18 in an amount sufficient to render the chemically modified mineral amphipathic. In one embodiment, the pigment extender comprises anhydrous kaolin. The primary diamino silane oligomers can comprise for example Evonik 1146 (from Evonik Industries AG) or JH-AP-1231 (from Jianghan Fine Chemicals). The blend of alkyltrialkoxy and primary amino alkyltrialkoxysilane can comprise for example a blend of octyltriethoxysilane and aminopropyltriethoxysilane. The mineral is treated with the primary diamino silane oligomer or blend of alkyltrialkoxy and primary amino alkytrialkoxysilane in concentrations ranging from about 1%-5%, preferably 1%-2.5%, for example in concentrations such as 1.0%, 1.5%, 2.0%, or 2.5%. The mineral can have a density of 2.2 g/cc to 2.8 g/cc, and an average particle size of 0.1-5.0 μm.

Also disclosed is a coating material comprising anhydrous kaolin that has been chemically modified with a primary diamino silane oligomer or a blend of alkyltrialkoxy and primary aminoalkyltrialkoxysilane having a cured carbon to nitrogen ratio (C/N) of 9 to 18 in an amount sufficient to render the chemically modified kaolin amphipathic. The coating in which the coating material is incorporated may be water based or non-water based. The coating can comprise the chemically modified kaolin material interspersed with a pigment such as $TiO_2$. The primary diamino silane oligomers can comprise for example Evonik 1146 (from Evonik Industries AG) or JH-AP-1231 (from Jianghan Fine Chemicals). The blend of alkyltrialkoxy and primary amino alkyltrialkoxysilane can comprise for example a blend of octyltriethoxysilane and aminopropyltriethoxysilane. The kaolin is treated with the primary diamino silane oligomer or blend of alkyltrialkoxy and primary aminoalkyltrialkoxysilane in concentrations ranging from about 1%-5%, preferably 1%-2.5%, for example in concentrations such as 1.0%, 1.5%, 2.0%, or 2.5%. The kaolin can have a density of 2.2 g/cc to 2.8 g/cc, and an average particle size of 0.1-5.0 The coating material may be used, for example, in a paint, an epoxy or an adhesive coating. The paint may include, for example, a latex paint or an acrylic paint. The coating material can exhibit amphipathic properties when applied to a surface characterized for example by good wettability when being incorporated into the paint.

Also disclosed is a coating composition comprising a solvent, a binder and a silane treated mineral. The silane treated mineral can be an anhydrous kaolin that has been chemically modified with a primary diamino silane oligomer or a blend of alkyltrialkoxy and primary aminoalkyltrialkoxysilane having a cured carbon to nitrogen ratio (C/N) of 9 to 18 in an amount sufficient to render the silane treated kaolin amphipathic. The coating may be water based or non-water based. The coating can comprise the chemically modified kaolin material interspersed with a pigment such as $TiO_2$. The coating can further comprise a surfactant. The surfactant can be nonionic, anionic, or cationic. The surfactant can include nonylphenol ethoxylates, octylphenol ethoxylates, polymers of ammonium salt, sodium salt, or potassium salt, as well as copolymers thereof. The coating can further comprise a biocide to protect against microbial attack. The primary diamino silane oligomers can comprise for example Evonik 1146 (from Evonik Industries AG) or JH-AP-1231 (from Jianghan Fine Chemicals). The blend of alkyltrialkoxy and primary amino alkyltrialkoxysilane can comprise for example a blend of octyltriethoxysilane and aminopropyltriethoxysilane. The kaolin is treated with the primary diamino silane oligomer or blend of alkyltrialkoxy and primary aminoalkyltrialkoxysilane in concentrations ranging from about 1%-5%, preferably 1%-2.5%, for example in concentrations such as 1.0%, 1.5%, 2.0%, or 2.5%. The kaolin can have a density of 2.2 g/cc to 2.8 g/cc, and an average particle size of 0.1-5.0 The coating can be a paint, an epoxy or an adhesive coating. The paint may include, for example, a latex paint or an acrylic paint. The coating can exhibit amphipathic properties when applied to a surface characterized for example by good wettability when being incorporated into the paint.

Also disclosed is a method of forming a coating comprising incorporating into a coating material an anhydrous kaolin pigment extender that has been chemically modified with a primary diamino silane oligomer or a blend of alkyltrialkoxy and primary aminoalkyltrialkoxysilane having a cured carbon to nitrogen ratio (C/N) of 9 to 18. The primary amino oligomer or blend of alkyltrialkoxy and primary aminoalkyltrialkoxysilane can comprise a stable blend of alkyltrialkoxysilane and a primary aminoalkyltrialkoxysilane, including for example a blend of octyltriethoxysilane and aminopropyltriethoxysilane. The kaolin is treated with the primary diamino silane oligomer or blend of alkyltrialkoxy and primary amino alkyltrialkoxysilane in concentrations ranging from about 1%-5%, preferably 1%-2.5%, for example in concentrations such as 1.0%, 1.5%, 2.0%, or 2.5%. The kaolin can have a density of 2.2 g/cc to 2.8 g/cc, and an average particle size of 0.1-5.0 The coating can be a water based paint or a non-water based paint, or an epoxy or an adhesive. The paint may include, for example, a latex paint or an acrylic paint.

BRIEF DESCRIPTION OF THE DRAWINGS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

FIG. 7 shows a comparison of the properties of various Silane Treated Anhydrous Kaolin Properties for various silanes including silane blends and oligomers. Subscript "M" for measured values and "C" for calculated values. Both reported as a rounded whole value. Measured analysis, "M", were performed on a Leco C230 and TruMac-CN analyzers.

FIG. 9 shows a comparison of 67% PVC (pigment volume concentration) latex flat paints produced with untreated anhydrous kaolin and those treated with silanes of varied C/N ratios.

FIG. 10 shows a graphical comparison of the abrasive scrub resistance ASTM D2486 with shim cycles until failure for the 67% PVC latex flat paint formulations with varied C/N ratios.

FIG. 11 shows a graphical comparison of dry film water uptake percentage for the 67% PVC latex flat paint formulations with varied C/N ratios.

FIG. 12 shows a graphical comparison of nigrosine stain resistance of dry paint formulations for the 67% PVC latex flat paint formulations with varied C/N ratios.

FIG. 13 shows a treated kaolin dosage study for sample 67% PVC architectural flat paint formulations to which untreated anhydrous kaolin and blended silane target of C/N 13 treated anhydrous kaolin materials were added (FIG. 13 and above).

FIG. 14 is a chart comparing optical properties imparted to the 67% PVC latex flat paint formulations by adding untreated anhydrous kaolin and various dosages of silane treated anhydrous kaolins.

FIG. 15 shows a graphical comparison of opacity by contrast ratio over black and white for films cast at 3 mils for the 67% PVC latex flat paint formulations containing untreated anhydrous kaolin and various dosages of silane treated anhydrous kaolin.

FIG. 16 shows a graphical comparison of Y reflectance cast at 3 mils for the 67% PVC latex flat paint formulations containing untreated anhydrous kaolin and various dosages of silane treated anhydrous kaolin.

FIG. 22 shows a comparison of 67% PVC latex flat paint formulations containing untreated anhydrous kaolin, various dosages of silane treated anhydrous kaolin and various dosages of anhydrous kaolin formulations in which silane additions were made in situ.

FIG. 26 shows sample elastomeric roof coating formulations to which untreated anhydrous kaolin and silane treated anhydrous kaolin materials were added.

FIG. 27 is a chart comparing optical properties imparted to the elastomeric roof coating formulations by adding untreated anhydrous kaolin and various dosages of silane treated anhydrous kaolins.

FIG. 38 compares sample paint formulations in which $TiO_2$ pigment loading is reduced by 20% through the addition of untreated anhydrous kaolin and various dosages of silane treated anhydrous kaolin materials.

FIG. 39 is a chart comparing optical properties imparted to paint formulations in which $TiO_2$ pigment loading is reduced by 20% through the addition of untreated anhydrous kaolin and silane treated anhydrous kaolin materials.

FIG. 44 compares 63% PVC architectural acrylic flat paint formulations to which untreated anhydrous kaolin and silane treated anhydrous kaolin materials were added.

FIG. 45 is a chart comparing optical properties imparted to the 63% PVC architectural acrylic flat paint formulations to which untreated anhydrous kaolin and silane treated anhydrous kaolin materials were added.

DETAILED DESCRIPTION

Figure 1:
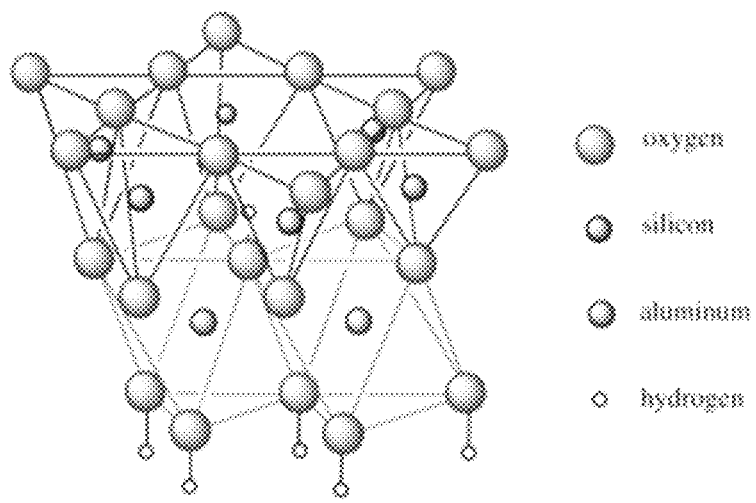
FIG. 1 shows a molecular diagram of a kaolinite platelet.

The term kaolin is used to describe a naturally occurring clay material composed primarily of the mineral kaolinite with the empirical formula $Al_2O_3 \cdot 2SiO_2 \cdot 2H_2O$. FIG. 1 is a molecular diagram of a kaolinite platelet composed of oxygen 12, silicon 14, aluminum 16, and hydrogen 18. Refined hydrous kaolin is comprised of approximately 37% alumina, 45% silica, and 14% crystalline bound water, allowing up to 4% for other trace minerals such as oxides of iron, titanium, and potassium. The morphology of these hydrous aluminum silicate crystals gives rise to stacked hexagonal platelets, which range in size from less than 1 micron up to 10 microns. Each individual platelet consists of a tetrahedral silica ring bound by oxygen linkages to an alumina octahedral sheet, with an adequate number of hydroxyl groups rendering it hydrophilic.

"Anhydrous Kaolin" results from heat treating (calcining) "raw" or "hydrous" kaolin to a metakaolin state where the crystal structure water is released resulting in an amorphous material and can be heated further beyond the rapid crystallization of gamma-$Al_2O_3$ (mullite formation) if desired. Anhydrous kaolin as used herein includes either partially calcined to produce metakaolin, fully calcined to produce soak calcined kaolin, or rapidly calcined to produce flash calcined kaolin.

Calcination begins with exposure of hydrous feedstock to temperatures starting at approximately 650° C. where surface hydroxyls are driven off to form liquid water vapor. At temperatures between 750° C. and 1100° C., kaolinite particles undergo nonreversible morphological transformations where density, color, and degree of oil absorbency can vary dependent upon the duration and residence time of thermal exposure.

Figure 2:
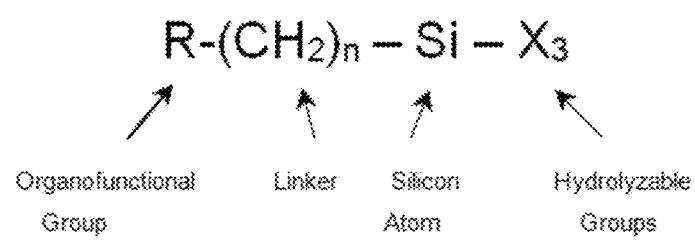
FIG. 2 shows the silane organic functional group, linker, silicon atom and one or more hydrolyzable groups.

Silanes have an affinity for kaolin; therefore, the mineral can be chemically modified with these molecules where covalent bonds form on the surface. Silanes contain an organic functional group and one or more hydrolyzable groups as shown in FIG. 2.

Figure 3:
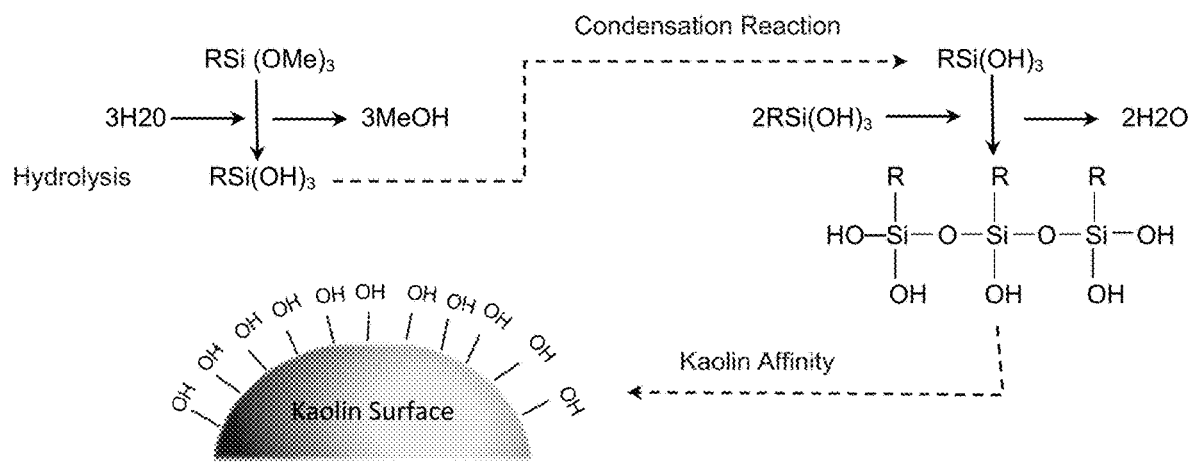
FIG. 3 shows the hydrolysis and condensation reaction of silane to the surface of kaolin.
Figure 4:
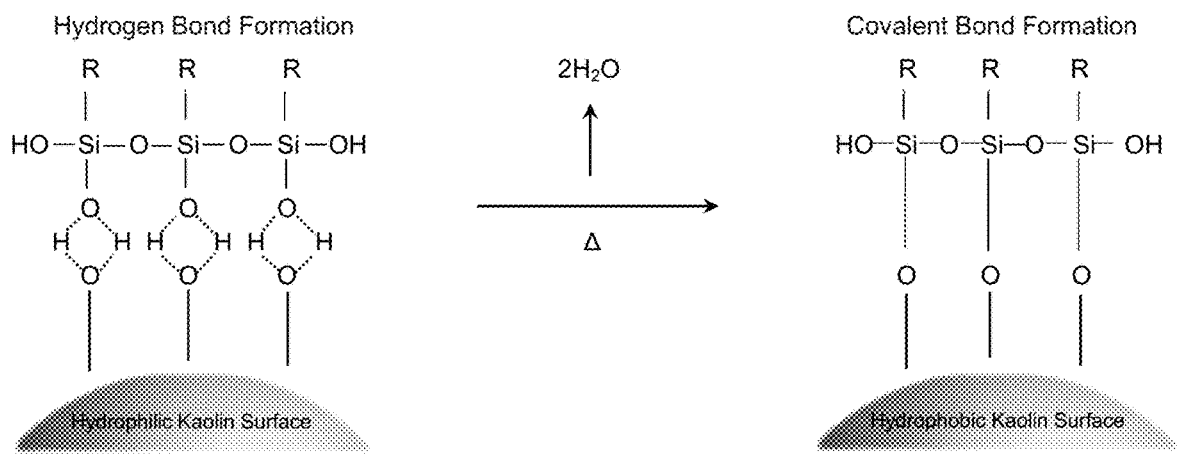
FIG. 4 shows the silane bond formation on the surface of kaolin minerals.

The reaction of silane to the surface of kaolin involves four steps as shown in FIGS. 3 and 4. First, hydrolysis of the hydrolyzable groups takes place where alcohols are cleaved off. During the next step, condensation takes place where water is given off and silanols are formed. These silanols hydrogen bond with surface hydroxyls on the kaolin surface, then non-reversible covalent bond formation takes place between the silane and the kaolin particle.

Kaolin whether in the raw form or calcined both act as excellent bonding substrates for a number of silane chemistries. Based on the above reaction mechanism, it can be seen that the hydrolyzable groups bond with the mineral surface, leaving the organic functional group exposed. This functional group can be reactive, thus allowing coupling with other reactive polymeric materials, or it can be non-reactive but function to change the properties of the kaolin mineral.

Although anhydrous kaolin offers superior optical performance and is the preferred substrate for chemical modification with silane treatments as described herein, other minerals such as for example diatomaceous earth, silica, quartz, hydrous aluminum silicate, synthetic silicates, inorganic oxides (e.g. $Fe_2O_3$, $ZnO$, $TiO_2$, $Cr_2O_3$), wollastonite, calcium carbonate either dry ground or precipitated, mica, gypsum, barytes, carbon black talc, nepheline syenite, attapulgite can be surface treated as well and are within the scope of this invention. These minerals range in silane effectiveness or the ability to make multiple covalent bonds with the surface. In other words, substrates with a high affinity for siloxane groups can easily form a monomolecular layer at low dosages, whereas low affinity surfaces might require much higher levels of silane to achieve the desired properties. A typical coating composition to which the silane treated anhydrous kaolin or other mineral may be added is comprised of multiple ingredients, one of which is a solvent. An example could be water or it could be an organic, non-aqueous solvent system. The organic solvent could be, for example, either aromatic or aliphatic. Other ingredients can include a thickener, such as for example, hydroxyethylcellulose (HEC), HEUR (nonionic polyurethane associative thickener), ASE (alkali swellable emulsions), or bentonite clays.

Surfactants also can be included in the coating composition to reduce surface tension, which can help in the wetting of pigments and fillers in the solvent. The surfactants can also aid in improving the wetting of the liquid paint to the surface in which it is being applied. Surfactants can be, for example, nonionic, anionic, or cationic. Examples include nonylphenol ethoxylates, octylphenol ethoxylates, polymers of ammonium salt, sodium salt, or potassium salt, as well as copolymers. A coating formula also can include biocide to protect against microbial attack. A coating also typically includes a binder, which acts to encapsulate the non-volatile components, and functions to adhere to and protect the substrate to which the coating is applied. Examples of binders include, for example, acrylic emulsion, vinyl emulsion, alkyd emulsion, alkyd resin, epoxy, urethane, or other binders as are known in the art. A coating formula might also include a pigment. Pigment examples could include titanium dioxide, carbon black, phthalo blue, toluidine red, or diacryl yellow. The anhydrous kaolin can be included in the composition as a mineral filler or pigment extender, which can offer different functionalities. For example, mineral fillers can act as fillers to increase the volume solids of the film, improve the opacity of the film, or they can act as matting agents to reduce the angular sheen of films. An exemplary latex paint composition of this type is set forth in Table 1.

TABLE 1

Matte Flat Architectural Latex Paint Formulation

| Ingredient: | Amount (weight units) | Ingredient Type: |
|---|---|---|
| Water | 300.00 | Solvent |
| Natrosol 250 HBR | 5.00 | Thickener, HEC |
| Acticide MBS | 2.00 | Biocide |
| Igepal CO-630 | 2.00 | Nonionic Surfactant |
| Tamol 731A | 10.00 | Anionic Surfactant |
| Sift in the following three items with agitation | | |
| Ti-Pure R-706 | 100.00 | Pigment $TiO_2$ |
| Iceberg Anhydrous | 100.00 | Mineral Filler Kaolin Clay, |
| Omyacarb 6 | 300.00 | Mineral Filler Calcium Carbonate |
| High speed Cowels disperse | | |
| Encor 379G | 181.00 | Binder, Vinyl Latex Emulsion |

Referring now to Table 1, it can be seen that in preparing an exemplary matte flat architectural latex paint composition the solvent is added first, which acts as a vehicle to bring in the other ingredients. The hydroxyethylcellulose (HEC) thickener is added to the solvent, which in this case is water. Surfactants are then added that break the surface tension of the water and allow pigments and mineral fillers to incorporate easily. This mixture is then dispersed at high speed using a Cowles mixer. Here, the pigments and fillers are fully ground where agglomerates are broken down to fine particles. This is called the "grind phase". After this is accomplished, the binder is mixed in slowly to complete the process. This is called the "letdown" phase.

Functional mineral fillers would be considered those materials that contribute more than one function. For example, anhydrous kaolin can be considered a functional mineral filler by contributing to solids composition of the film, the wet and dry opacity, and matting of angular sheen. Kaolin clay minerals are particles comprised of stacked platelets. The clay particles are crystalline structures that refract or diffuse incident light. This scattering of light acts to improve the opacity of paint films. Titanium dioxide ($TiO_2$) is another mineral that offers good light scattering effects and contributes greatly to the opacity of the thin paint film. Kaolin clays impart good opacity when used with $TiO_2$ because the minerals act to space the $TiO_2$ particles, preventing crowding within the film, and also aid in the total refraction of light.

Figure 7:
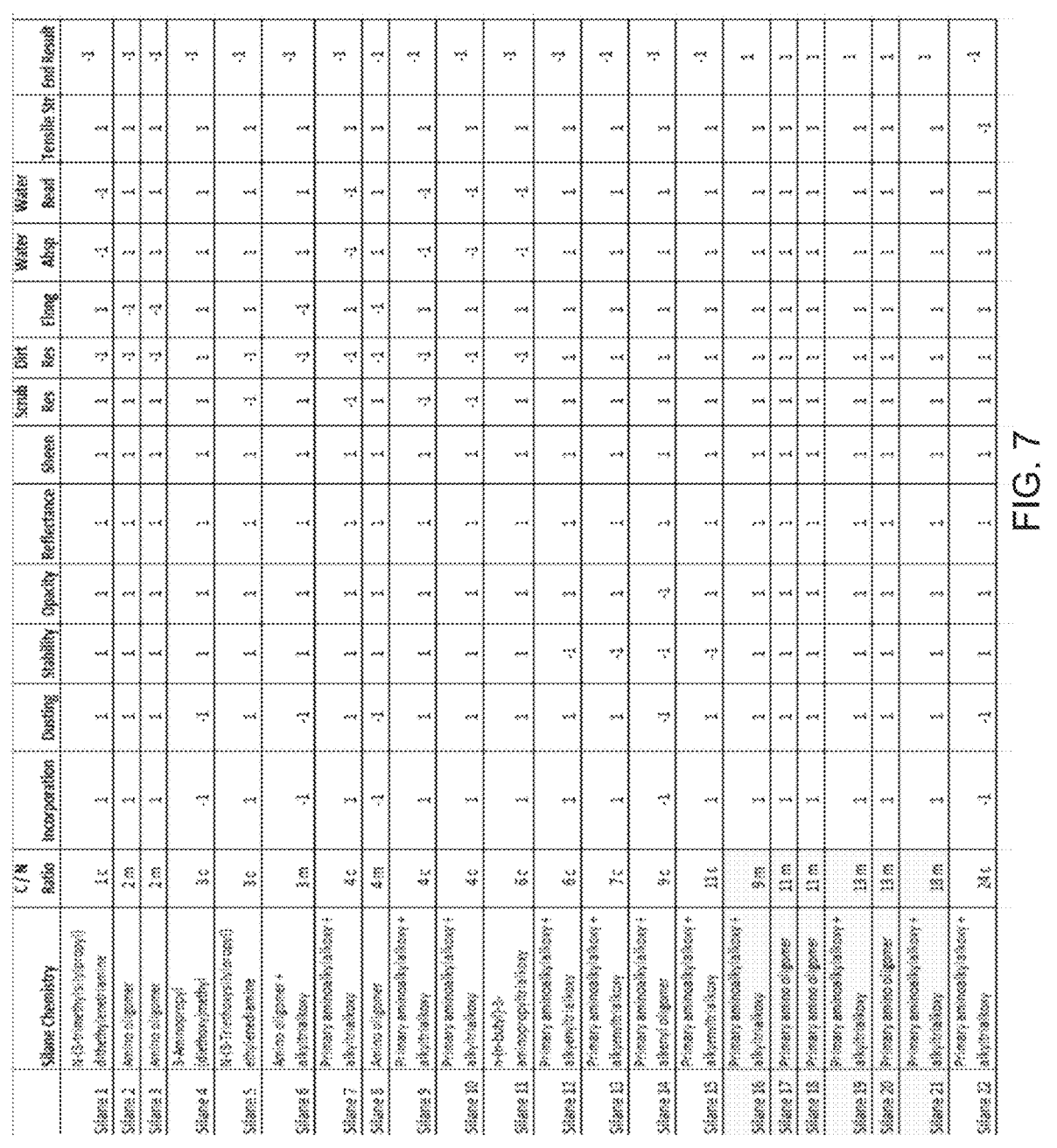

Experimental silane surface treatment of anhydrous kaolin was performed using varied chemistries and dosage levels, then compounded into waterborne coatings to determine if improved properties could be obtained. First calcined kaolin of 2.6 g/ml density and average particle size of 0.1-5.0 μm was treated with functional alkoxysilane variations. Each of these iterations were incorporated into the coating formulations and compared to untreated controls, which are shown in FIG. 7 and compares the following attributes:

Performance and commercial usefulness of silane treated kaolin materials can be assessed based on a variety of factors including:

Ease of Incorporation—Anhydrous Kaolin can be introduced into waterborne formulations at varied loadings and compared to untreated kaolin for ease of dispersion including wettability, foam generation, and grind time required.

Dusting Resistance—Anhydrous Kaolin can be introduced into waterborne formulations and rated according to the resistance to produce airborne particulates. One way to assess this is to place a small amount of dry pigment sample into a lidded container, shake vigorously, and then remove the lid removed and observe the amount of dusting.

Paint Stability—The viscosity of each finished paint or coating can be measured initially, then at 24 hours. The containers can then be placed on a shelf at ambient temperature for one month, and the amount of settling or separation is then observed. The viscosity is then remeasured and compared to the original 24 hour viscosity. The paints that exhibited no unwanted separation, settling, or increase in viscosity can then be placed in an oven at 120° F. for one month, and viscosity measured again.

Opacity by Contrast Ratio—Material is cast onto black and white sealed opacity chart using 3 mil Bird Blade and allowed to dry at ambient temperature for 24 hours. Contrast ratio over black and white is read using Hunter Lab Colorflex Portable Spectrophotometer in accordance with ASTM D2805-11.

Reflectance—Material is cast onto black and white sealed opacity chart using 3 mil Bird Blade and allowed to dry at ambient temperature for 24 hours. Reflectance over white is measured using Hunter Lab Colorflex Portable Spectrophotometer in accordance with ASTM E1331-09.

Angular Sheen—Material is cast onto black and white sealed opacity chart using 3 mil Bird Blade and allowed to dry at ambient temperature for 24 hours. 20 degree sheen and 60 degree gloss were measured using BYK Micro-Tri-Gloss Meter in accordance with ASTM D523.

Stormer Viscosity—Test paints are measured into 16 oz containers and temperature adjusted in water bath to 77° F. The viscosity is determined through use of stormer viscometer and recorded as kreb units in accordance with ASTM D562.

CIE L*a*b* Color Difference—Material is cast onto black and white sealed opacity chart using 3 mil Bird Blade and allowed to dry at ambient temperature for 24 hours. L, a, b values are measured using Hunter Lab Colorflex Portable Spectrophotometer in accordance with ASTM E1331-09.

pH—Paints are allowed to equilibrate then calibrated pH meter probe is placed into the test material and stirred several times before final pH is determined.

Abrasive Scrub Resistance—Test paints are cast side-by-side using a standard 3 mil Bird Blade Applicator bar onto a black Leneta scrub panel and allowed to cure for 7 days. Two separate test panels are prepared so that samples are tested in duplicate, then results are averaged. Panels are then placed on scrub machine with shims and tested to the point of failure in accordance with the method (A) described in ASTM D 2486.

Stain Resistance (Nigrosine Dye)—Test paints are cast side-by-side next to the untreated control on black and white sealed opacity chart using 3 mil Bird Blade, then allowed to dry at ambient temperature for 24 hours. 2% nigrosine dye solution was delivered by pipette perpendicular across the paint surfaces then rated 1=poor, 10=excellent.

Enamel Holdout—Primers are applied side-by-side over a sealed and unsealed section of a Penopac Chart using a 3 mil Bird applicator bar and then cured for 24 hours. A solvent borne gloss black alkyd enamel was cast over both primers and allowed to cure for another 24 hours. The 60 degree and 20 degree gloss of the alkyd was then read over primer applied over both the sealed and unsealed sections of the panel.

Dirt Resistance (Soiling)—Coatings were cast onto aluminum 3×6 panels and allowed to cure 7 days. Panels were then placed in QUV accelerated weathering chamber 48 hours under continuous light exposure. Panels were removed, then brown iron oxide pigment slurry was applied using foam brush applicator, and left on for one hour. Panels were then rinsed and rubbed gently with clean foam applicator pad to remove residue. Y reflectance was then read in triplicate over the soiled area and averaged.

Elongation, Tensile, and Modulus of Films—Coatings were applied to release paper at 20 mils wet using multi-notch applicator bar and allowed to cure 24 hours. Then a second application was made over the first using a 40 mils gap. Films cured 14 days before testing.

Films were measured for thickness, then ½ inch rectangles were cut using dye cutter. Rectangular films were placed in a tens-o-meter and pressure applied at a selected rate. Five samples of each paint were tested and any anomalies discarded from the average. Percent elongation, percent modulus, and tensile PSI were recorded. Two controls were used, one without kaolin and one with untreated kaolin. ASTM D 6083 was used as a pass/fail indicator.

Water Absorption of Films—Nylon panel was weighed to 4 decimal places then immersed in water for 24 hours. The panel was dried with cotton cloth then re-weighed which showed no difference. This indicated that the panel did not absorb any of the water from the soaking and would act as a suitable substrate in which to test paint films. Films of each test paint were cast using 12 mil Bird Blade, then allowed to cure for 7 days. 4"×4" sections of each were cut out and weighed to 4 decimal places. The sections were then immersed in water for 24 hours, then removed, patted dry and re-weighed. The percent water absorption was then calculated.

Water Beading (Contact Angle)—Material was cast onto black and white sealed opacity chart using 3 mil Bird Blade and allowed to dry at ambient temperature for 24 hours. 2 ml of distilled water was placed onto each film and left for 5 minutes. Water beading was then rated accordingly.

Figure 8:
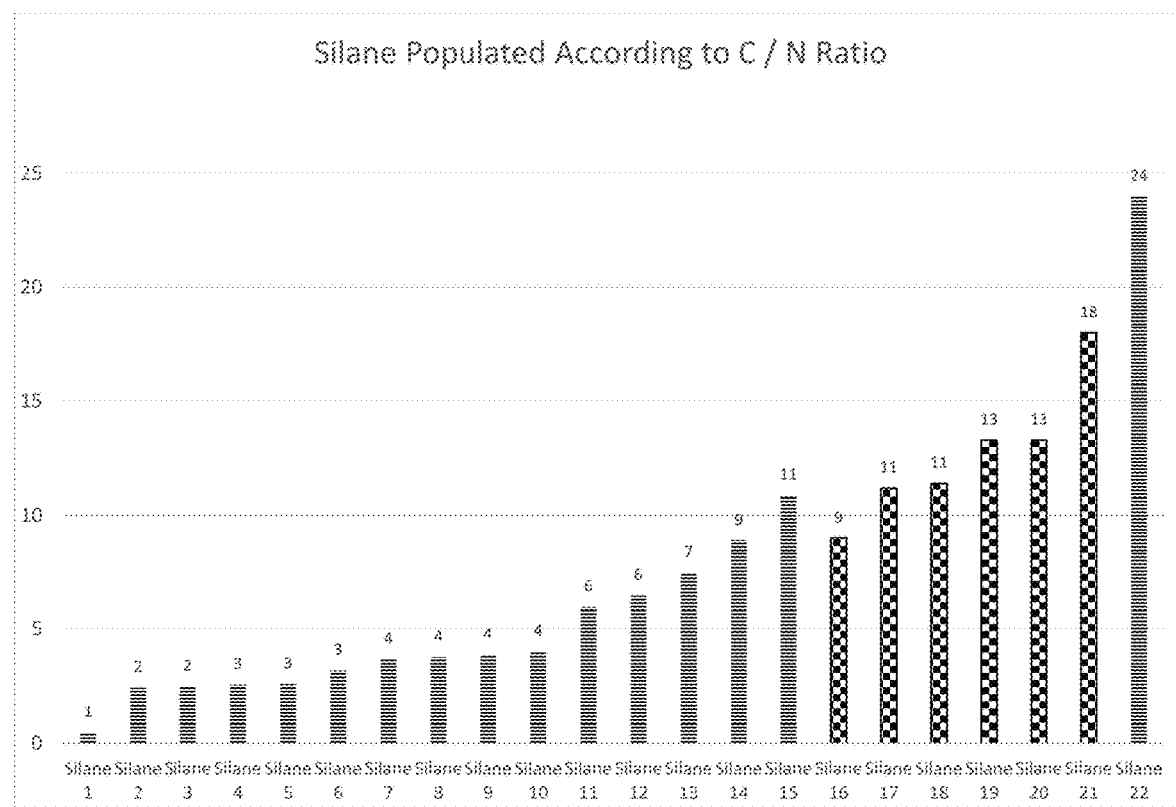
FIG. 8 shows a graphical depiction of the correlation between C/N ratio and the properties of the silanes compared in FIG. 7.

Results:

Anhydrous kaolins treated with a blend of alkyltrialkoxysilanes and primary aminoalkyltrialkoxysilane, as well as anhydrous kaolins treated with certain primary diamino silane oligomers have been found to provide improvements in coating properties, including paint film properties, while at the same time allowing easy incorporation of waterborne systems with good long-term stability. These silane treated kaolins exhibit amphipathic properties combining hydrophobic properties such as water resistance with hydrophilic properties such as good wettability. Referring now to FIG. 8, it has been determined that the cured carbon to primary amino nitrogen ratio, hence forth called "carbon:nitrogen ratio" or "C/N ratio", should be within a range of 9 to 18 to impart optimal amphipathic properties to the anhydrous kaolin treated with a blend of alkyltrialkoxysilanes and primary aminoalkyltrialkoxysilane, as well as anhydrous kaolins treated with certain primary diamino silane oligomers, and has been found to improve coatings incorporating the treated kaolin as a pigment extender or filler. Exemplary C/N ratios included Silane 16 with a C/N ratio of 9, Silane 17 and 18 with a C/N ratio of 11 Silane 19 and 20 with a C/N ratio of 13 and Silane 21 with a C/N ratio of 18. By contrast, referring now for example to Silane 15 in FIGS. 7 and 8, which is a blend of primary aminoalkylalkoxy+alkenyltrialkoxy silanes (AMEO(0.3%)+VTEO ((vinyl triethoxy silane) (1.25%)), fell within the desired C/N ratio range, but was unstable.

Figure 5:
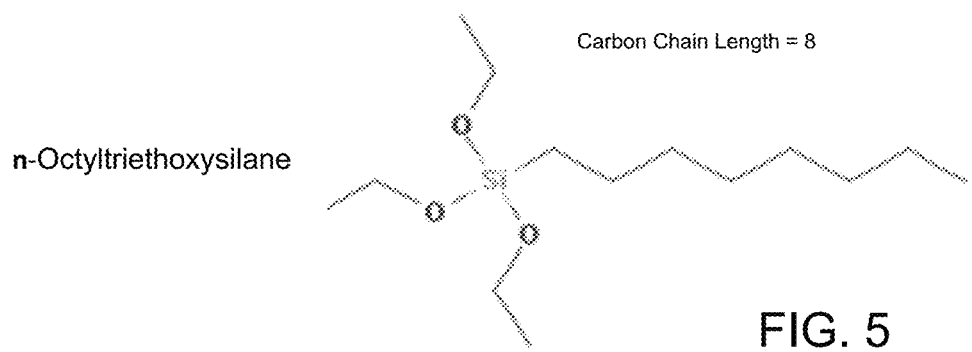
FIG. 5 shows the molecule octyltriethoxysilane, ("OCTEO"), having an 8 carbon chain making it non-polar.

Individual alkyltriethoxysilanes and aminoalkyltrialkoxysilanes when added to the kaolin by themselves and not as a blend were not found to achieve the desired amphipathic properties. For example, kaolin treated only with octyltriethoxysilane, ("OCTEO") (shown in FIG. 5), does not provide good wetting in waterborne systems. Molecules with varying degrees of hydrogen saturation and carbon length (2-50) would also be expected to be hydrophobic and exhibit difficult wetting in water. Kaolin clay particles treated with non-polar silanes tend to repel one another; therefore, the non-polar silane treated kaolin clay particles become airborne causing "dusting." Utilization of such a material is cumbersome because "dust clouds" ascend as the material is sifted into the grind phase of the paint manufacturing process.

Figure 6:
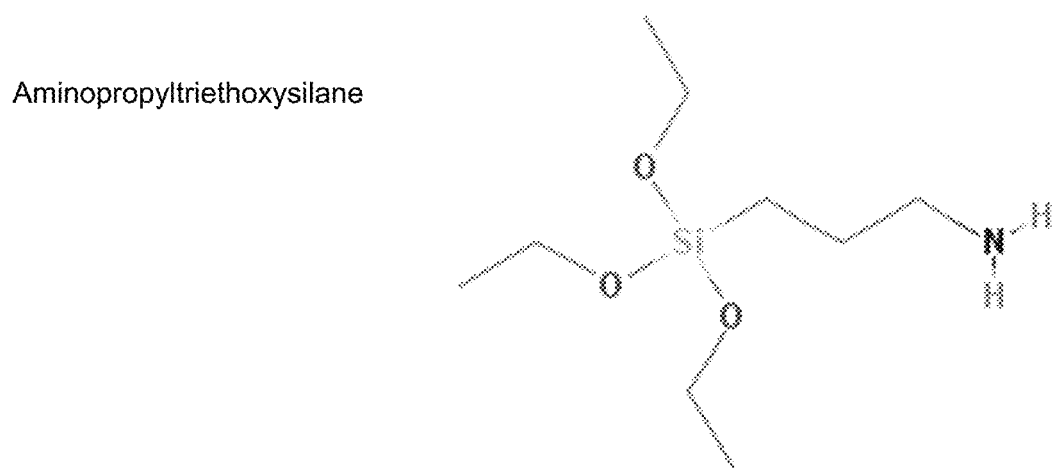
FIG. 6 shows the polar silane aminopropyltriethoxysilane, ("AMEO") and its short alkyl chain and the amine group located in the primary position.

Kaolin treated with a polar silane, such as for example aminopropyltriethoxysilane ("AMEO"), which includes an amine group located in the primary position as shown in FIG. 6, would be expected to exhibit good wettability, but also would tend to absorb water and would not exhibit good water resistance. When applied as part of a coating, this could result in the coating taking on water, resulting in peeling, blistering and damage to the underlying structure.

The blend of alkyltrialkoxy and primary aminoalkyltrialkoxysilane can comprise a stable blend of alkyltrialkoxysilane and a primary aminoalkytrilalkoxysilane, including for example a blend of alkyltrialkoxysilane and a primary aminoalkyltrialkoxysilane such as octyltriethoxysilane and aminopropyltriethoxysilane. An exemplary silane treatment for anhydrous kaolin comprises a blend of OCTEO (1% by weight) and aminopropyltriethoxysilane, ("AMEO") (0.5% by weight) Silane 19 (shown in FIG. 7), which resulted in a measured cured carbon:nitrogen ratio of 13. The cured carbon:nitrogen ratio may be calculated as follows. However, due to rounding there may be slight variations between the measured and the calculated C/N values. Where such variations occur, the measured values control for purposes of determining the C/N ratio. For primary amino silane oligomers containing more than one amino group (e.g. primary diamino silane oligomers), only the terminal amino group is counted for purposes of determining the C/N ratio, and as such, the measured value may need to be adjusted in such cases so that only the terminal amino group is being counted.

Example Calculation

AMEO molecular weight=221.3 g/mole; OCTEO molecular weight=276.5 g/mole.

AMEO contains 3 carbon atoms in the functional amino chain, so Cured Carbon=(3×12.011)/221.3 or 16.28%.

AMEO contains 1 nitrogen atom in the functional amino chain, so Cured Nitrogen=14.0067/221.3 or 6.33%.

OCTEO contains 8 carbon atoms in the alkyl chain, so % Cured Carbon=(8×12.011)/276.5 or 34.75%.

OCTEO/AMEO blend of 2:1 would have a C/N ratio of ((0.33×16.28)+(0.67×34.75))/(0.33×6.33)=C/N ratio of 13.7 rounded to 14.

The polarity of the functional primary amine group in the example described above, and in the primary amino silane oligomer, or in the stable blend of alkyl alkoxy and primary amino alkyl alkoxy silanes, having a cured carbon to nitrogen ratio (C/N) of 9 to 18, as disclosed herein, is believed to act to help prevent dusting issues. Primary diamino oligomeric silanes such as Evonik 1146 (from Evonik Industries AG) and JH-AP-1231 (from Jianghan Fine Chemicals) also have been found to effectively treat anhydrous kaolin, resulting in similarly beneficial properties as a pigment extender or filler as described above with respect to the silane blends.

Both the types of silanes used (e.g., primary diamino silane oligomer or a blend of alkyltrialkoxy and primary aminoalkyltrialkoxysilane), and the C/N ratio (9-18) are significant for achieving the desired properties. For example, a combination of AMEO and alkenyltrialkoxy resulted in a C/N ratio of 11, but was found to lack stability, such that it may not be able to maintain a useful shelf life if incorporated into a latex paint.

The total concentration of the alkyl and amino silane blends and oligomers determines the amount of coverage of the kaolin particles. It has been found that total concentrations from about 1-2.5%, while maintaining a C/N ratio of 9 to 18, resulted in the best overall properties. Lower concentrations would be expected to result in less coverage of the kaolin particles and greater amounts result in excess coverage of the particles, an unnecessary expense.

FIG. 9 shows a comparison of 67% PVC paints produced with silane treated and untreated anhydrous kaolin and the compositions of those paints. First, a control formula was prepared using the untreated calcined kaolin, then treated controls were prepared using 1.0% VTEO and 1.5% amino functional oligomer. The treated experimental silane blends of OCTEO and AMEO were then compounded into the formulation where attributes were compared to both treated and untreated controls for incorporation, dusting, and film performance. All kaolin samples were evaluated at equal weight percent. Comparative performance properties also are listed and depicted graphically in FIGS. 10-12. As can be seen in FIG. 9, embodiments of the inventive silane treated anhydrous kaolins with C/N ratios of 9 to 18 offered superior performance to the paints containing untreated anhydrous kaolin or kaolins treated with silanes with C/N ratios either below or above this range. For example, silane treated kaolin with a C/N ratio of 24 failed to sufficiently incorporate into the paint composition and could not be used for a number of other tests.

Referring now to FIG. 10, abrasive scrub resistance was substantially improved for an exemplary 67% PVC flat paint formulation that included the silane treated kaolin, with the samples having a C/N ratio of between 9 and 18 able to withstand 76-80 cycles until failure. Whereas the samples that included silane treated kaolin with a C/N ratio of 4.03 (which was comprised of AMEO (1.5%) and OCTEO (0.4%) could withstand 71 cycles until failure and the untreated kaolin sample could withstand only 48 cycles until failure.

The addition of the inventive silane treated anhydrous kaolin reduced water uptake (absorption) of dry paint films by between 21.5%-23.6% as compared to untreated kaolin, with the samples incorporating the silane treated kaolin blends with a C/N ratio of 9 to 18 displaying the best hydrophobicity as depicted in FIG. 11. Whereas the silane treated kaolin blend with a C/N ratio of 4 increased water absorption by 4.6% compared to untreated kaolin.

Similarly, as shown in FIG. 12, stain resistance was improved for the samples treated with the inventive silane treated kaolin blends with a C/N ratio between 9 and 18 exhibiting the best performance as compared with the silane treated kaolin blend with a C/N ratio of 4.03 and the untreated kaolin. FIG. 13 shows a treated kaolin dosage study for sample 67% PVC architectural flat paint formulations to which untreated anhydrous kaolin and silane treated anhydrous kaolin materials were added. Sample A was an anhydrous (calcined) kaolin control to which no silane was added. Sample B contained anhydrous kaolin treated with a silane blend (0.67% OCTEO and 0.33% AMEO) at a dosage of 1%. Sample C contained anhydrous kaolin treated with a silane blend (0.67% OCTEO and 0.33% AMEO) at a dosage of 1.5%. Sample D contained anhydrous kaolin treated with a silane blend (0.67% OCTEO and 0.33% AMEO) at a dosage of 2%. Sample E contained anhydrous kaolin treated with a silane blend (0.67% OCTEO and 0.33% AMEO) at a dosage of 2.5%. Referring now to FIG. 14, it is seen that embodiments having silane treated anhydrous kaolins at dosages of 1.0%, 1.5%, 2.0% and 2.5% exhibit good optical properties and, gives rise to $TiO_2$ pigment extension for improved opacity and brightness in the coatings. Anhydrous and hydrous kaolin minerals achieve $TiO_2$ extension through spacing of particles and light scattering and/or refraction of light. Opacity and brightness were determined using contrast ratio and Y reflectance measurements. Reflectance values were only minimally reduced with all paints containing treated kaolin. These values are depicted in the graphical representations set forth in FIGS. 15 and 16.

Figure 18:
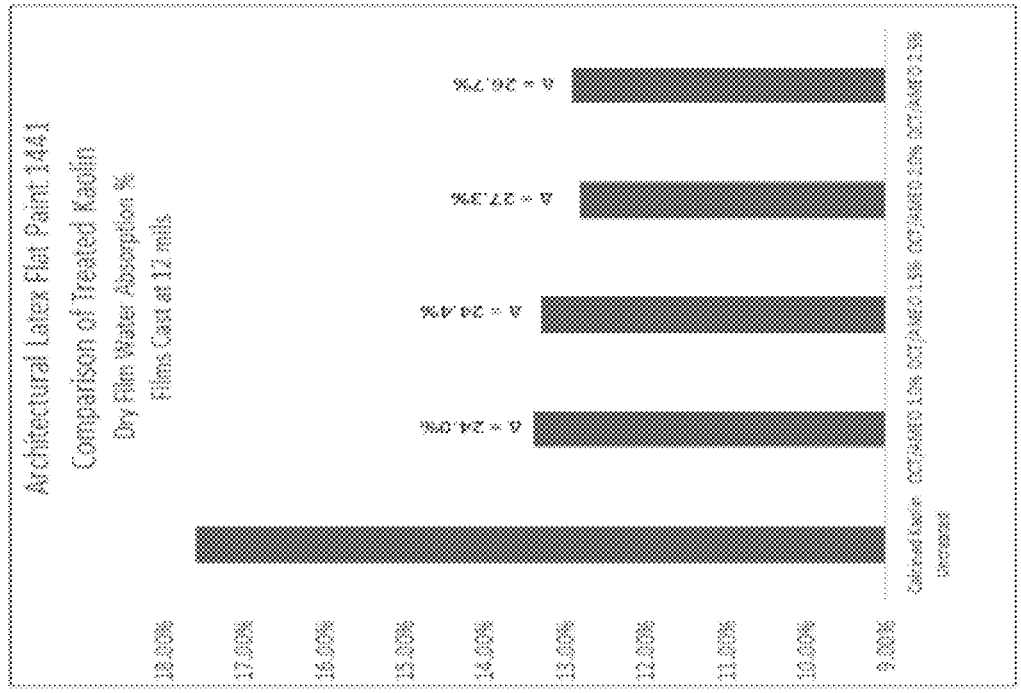
FIG. 18 shows a graphical comparison of dry film water uptake percentage for the 67% PVC latex flat paint formulations containing untreated anhydrous kaolin and various dosages of silane treated anhydrous kaolin.
Figure 17:
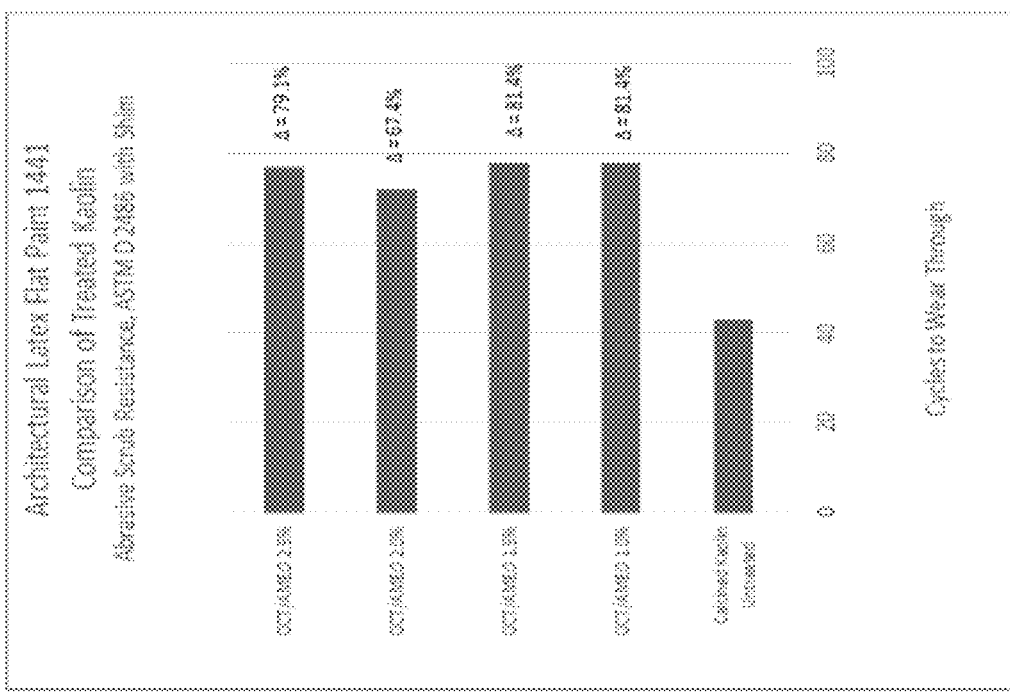
FIG. 17 shows a graphical comparison of the abrasive scrub resistance ASTM D2486 with shim cycles until failure for the 67% PVC latex flat paint formulations containing untreated anhydrous kaolin and various dosages of silane treated anhydrous kaolin.

Referring now to FIG. 17, it can be seen that abrasive scrub resistance was improved between 61.4%-81.4% with all treated test subjects. As can be seen in FIG. 18, reduction in water uptake (absorption) of dry paint films containing treated kaolin was reduced between 24%-27.3%, with the silane surface treatments.

Figure 19:
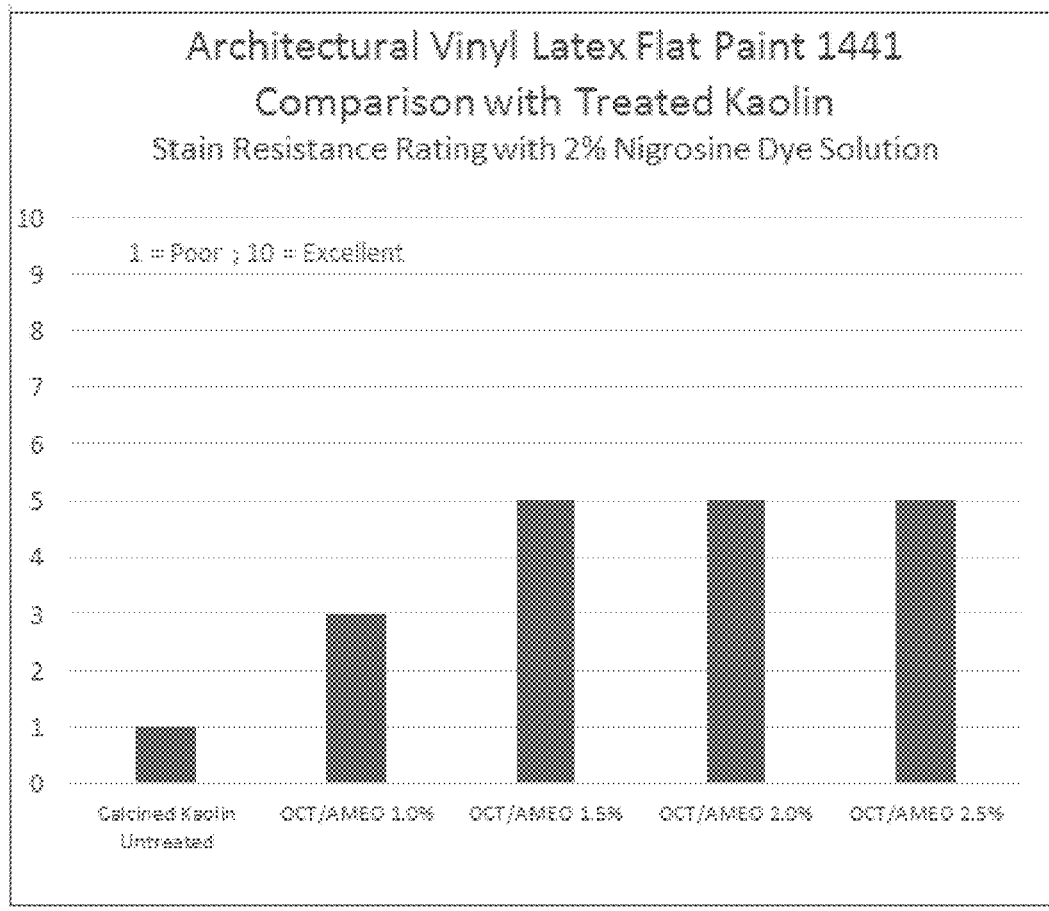
FIG. 19 shows a graphical comparison of nigrosine stain resistance of dry paint formulations for the 67% PVC latex flat paint formulations containing untreated anhydrous kaolin and various dosages of silane treated anhydrous kaolin.
Figure 20:
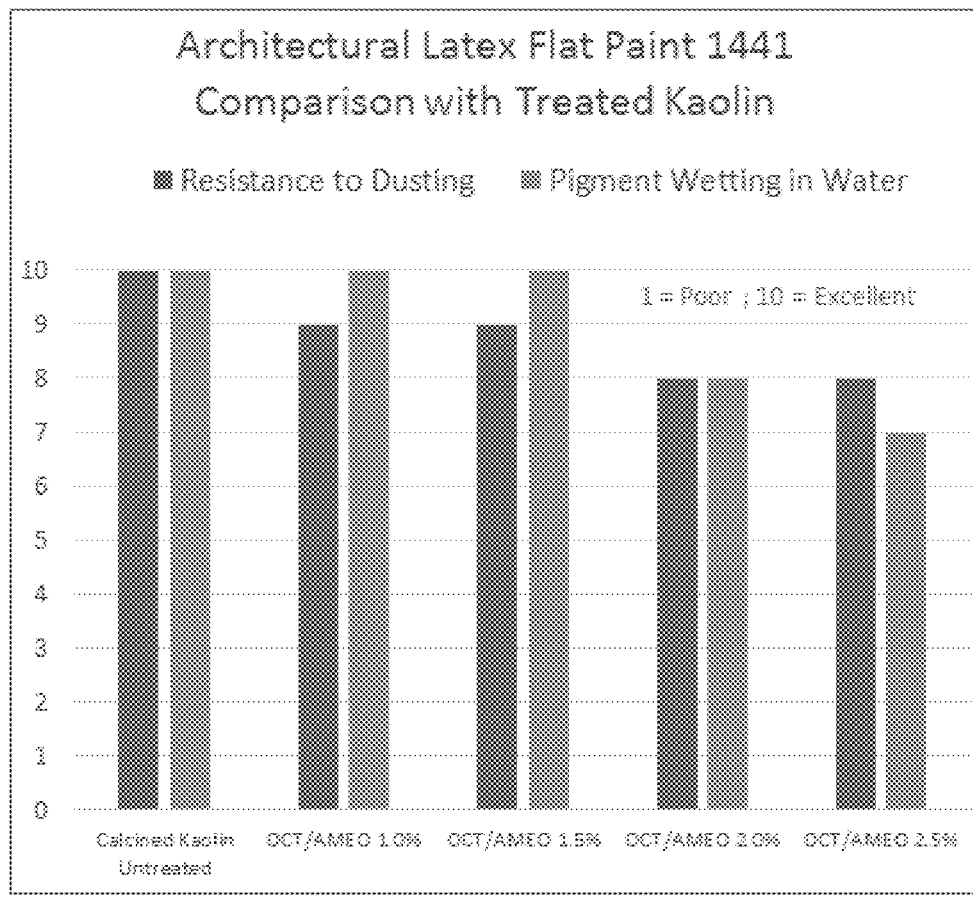
FIG. 20 shows a graphical comparison of resistance to dusting and pigment wetting in water for the 67% PVC latex flat paint formulations containing untreated anhydrous kaolin and various dosages of silane treated anhydrous kaolin.
Figure 21:
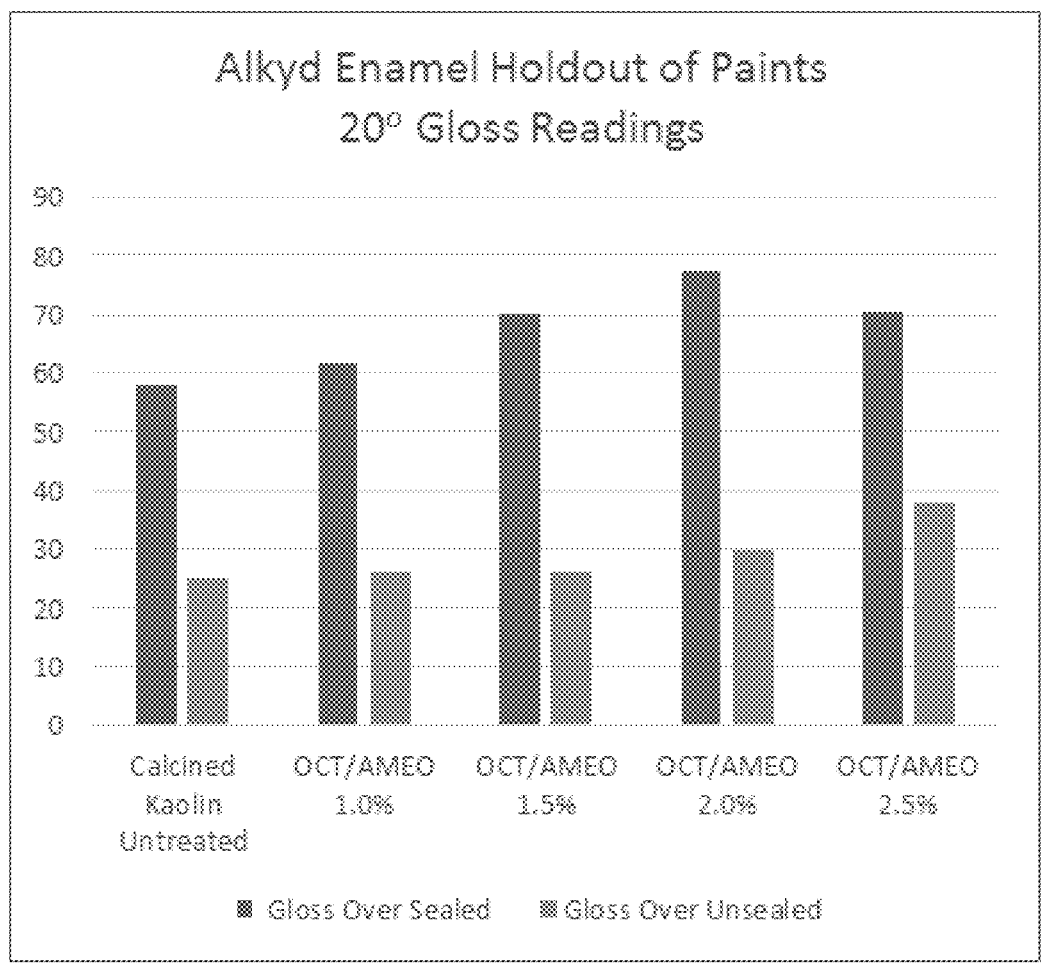
FIG. 21 shows a graphical comparison of enamel holdout test results for the 67% PVC latex flat paint formulations containing untreated anhydrous kaolin and various dosages of silane treated anhydrous kaolin.

Referring now to FIG. 19, stain resistance was improved with all treated samples, where the best performance was seen with 1.5%, 2.0%, and 2.5% samples. Referring now to FIG. 20, resistance to dusting and ease of pigment wetting was good with all experimental silane blended treatments. FIG. 21 is a graph comparing the results of an enamel holdout test that was performed. The test involved applying gloss alkyd enamel over the top of each paint film, then 20° gloss of the topcoat was recorded and compared to the untreated control paint. Enamel holdout proved to be better with all treated kaolin paints, indicating reduced porosity and "self-priming" properties.

Figure 23:
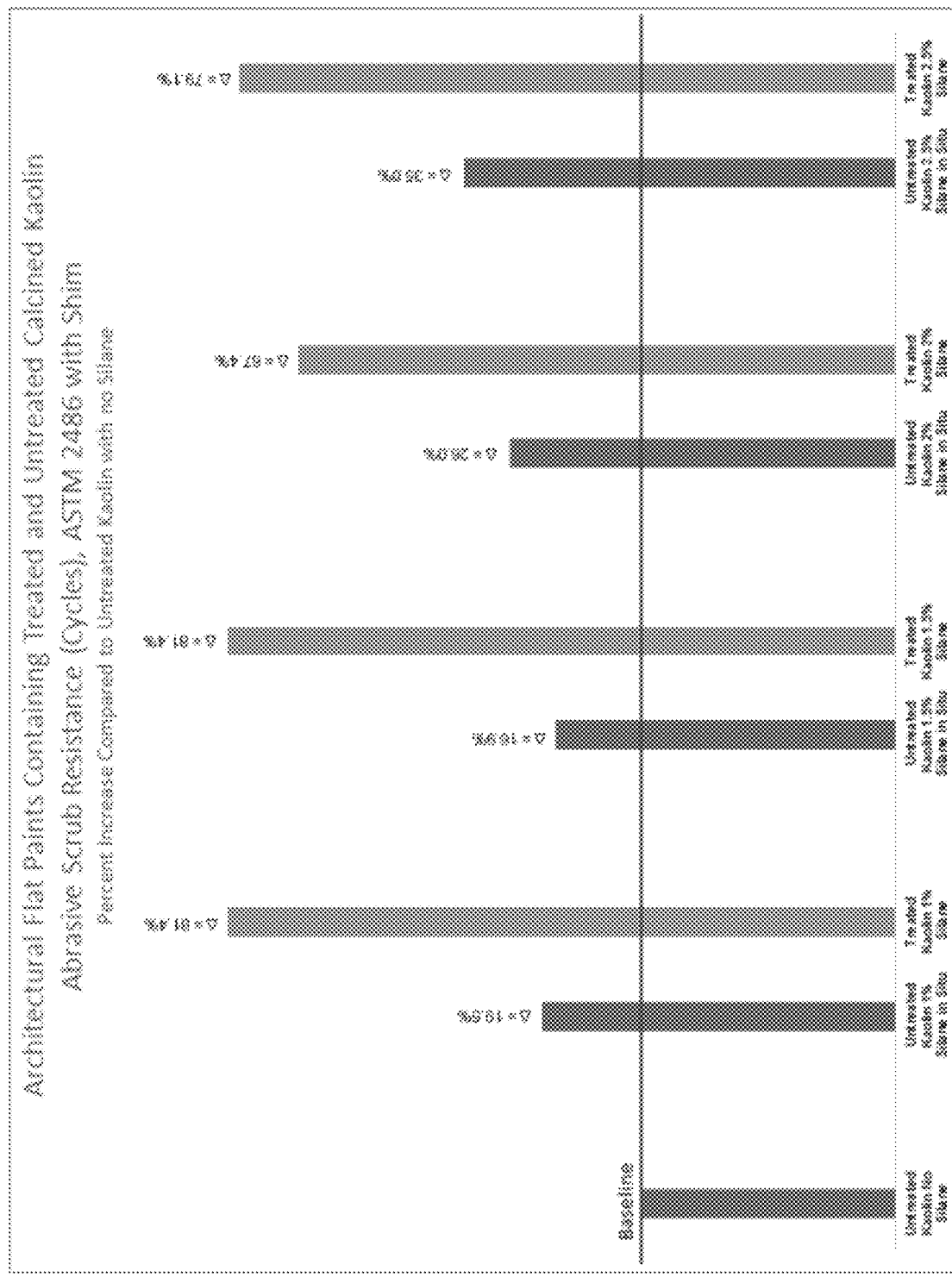
FIG. 23 shows a graphical comparison of the abrasive scrub resistance ASTM D2486 with shim cycles until failure for the 67% PVC latex flat paint formulations containing untreated anhydrous kaolin, various dosages of silane treated anhydrous kaolin, and various dosages of anhydrous kaolin with silane additions made in situ.
Figure 24:
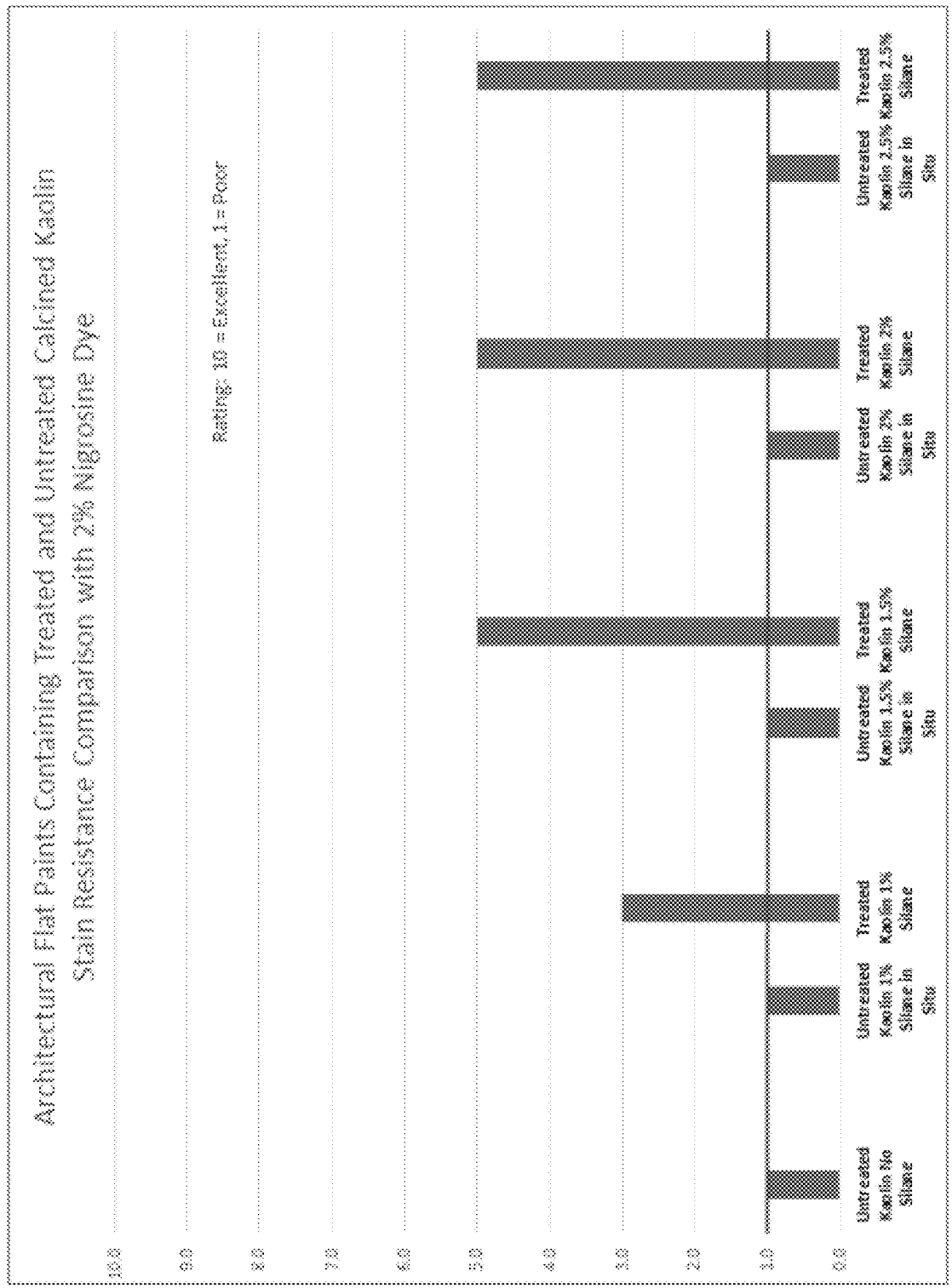
FIG. 24 shows a graphical comparison of nigrosine stain resistance of dry paint formulations for the 67% PVC latex flat paint formulations containing untreated anhydrous kaolin, various dosages of silane treated anhydrous kaolin, and anhydrous kaolin with various dosages of silane additions made in situ.
Figure 25:
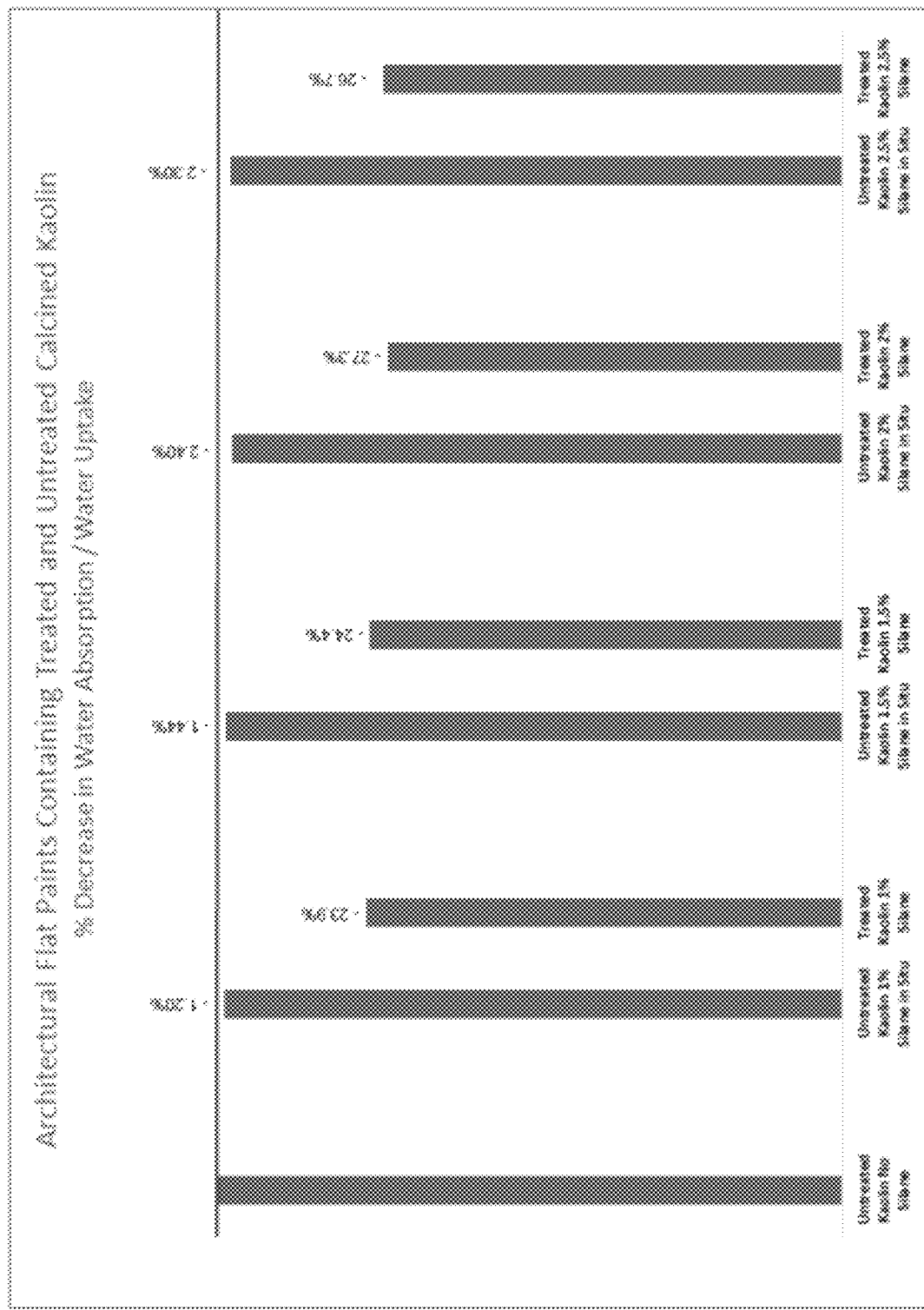
FIG. 25 shows a graphical comparison of dry film water uptake percentage for the 67% PVC latex flat paint formulations containing untreated anhydrous kaolin, various dosages of silane treated anhydrous kaolin, and anhydrous kaolin with various dosages of silane additions made in situ.
Figure 29:
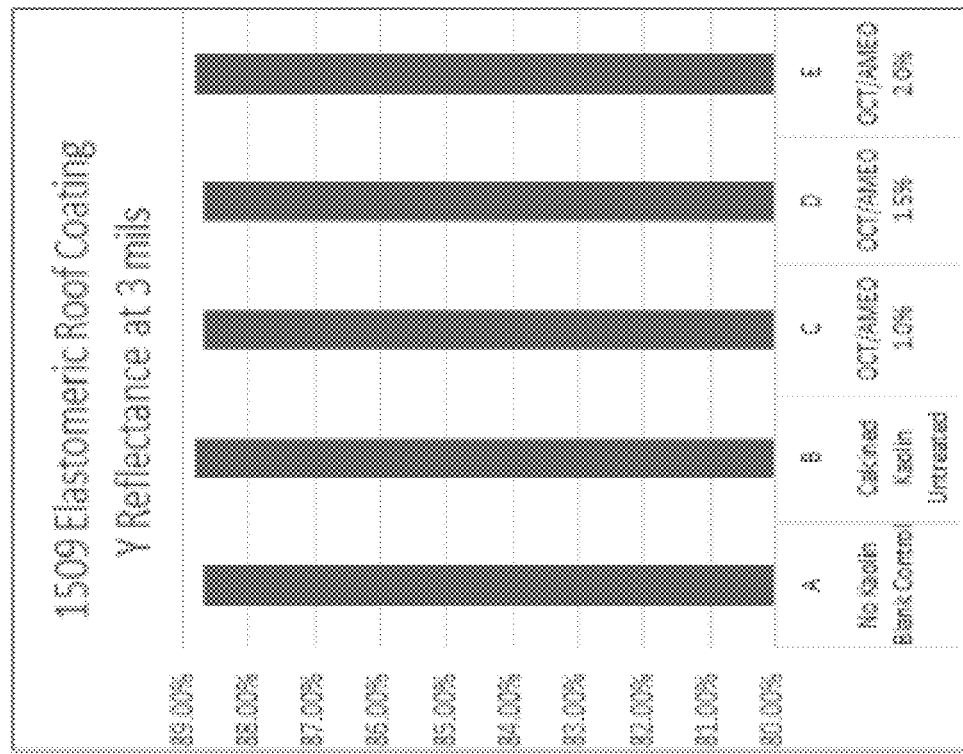
FIG. 29 shows a graphical comparison of Y reflectance cast at 3 mils for elastomeric roof coating formulations containing untreated anhydrous kaolin and various dosages of silane treated anhydrous kaolin.
Figure 28:
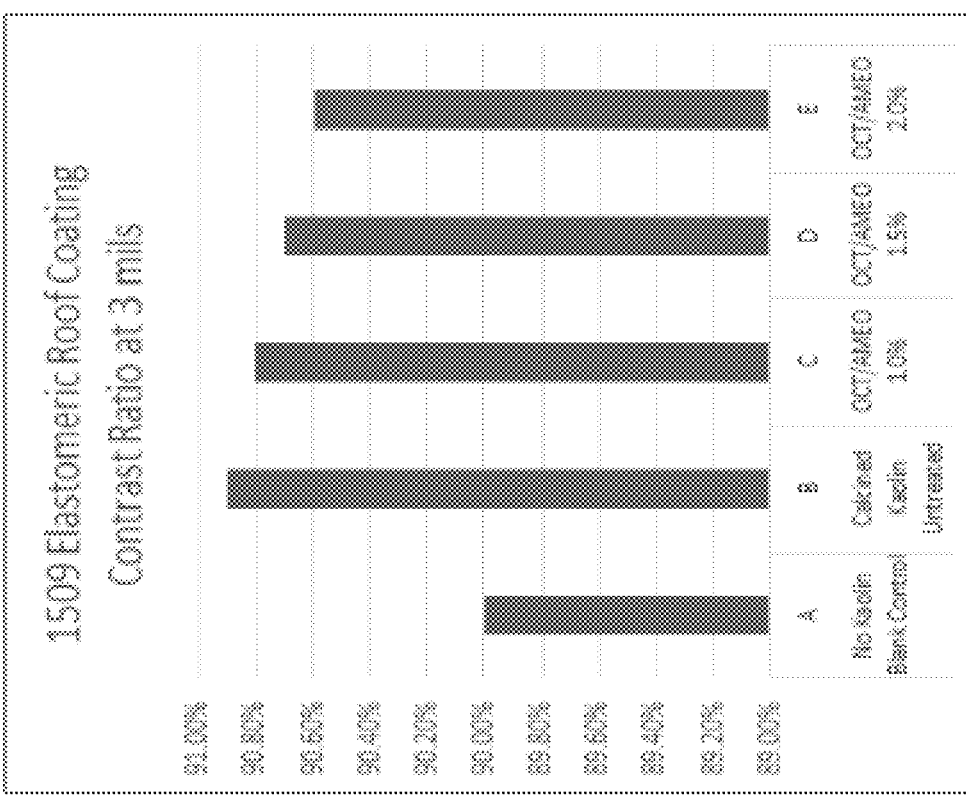
FIG. 28 shows a graphical comparison of opacity by contrast ratio over black and white for films cast at 3 mils for elastomeric roof coating formulations containing untreated anhydrous kaolin and various dosages of silane treated anhydrous kaolin.
Figures 30, 31:
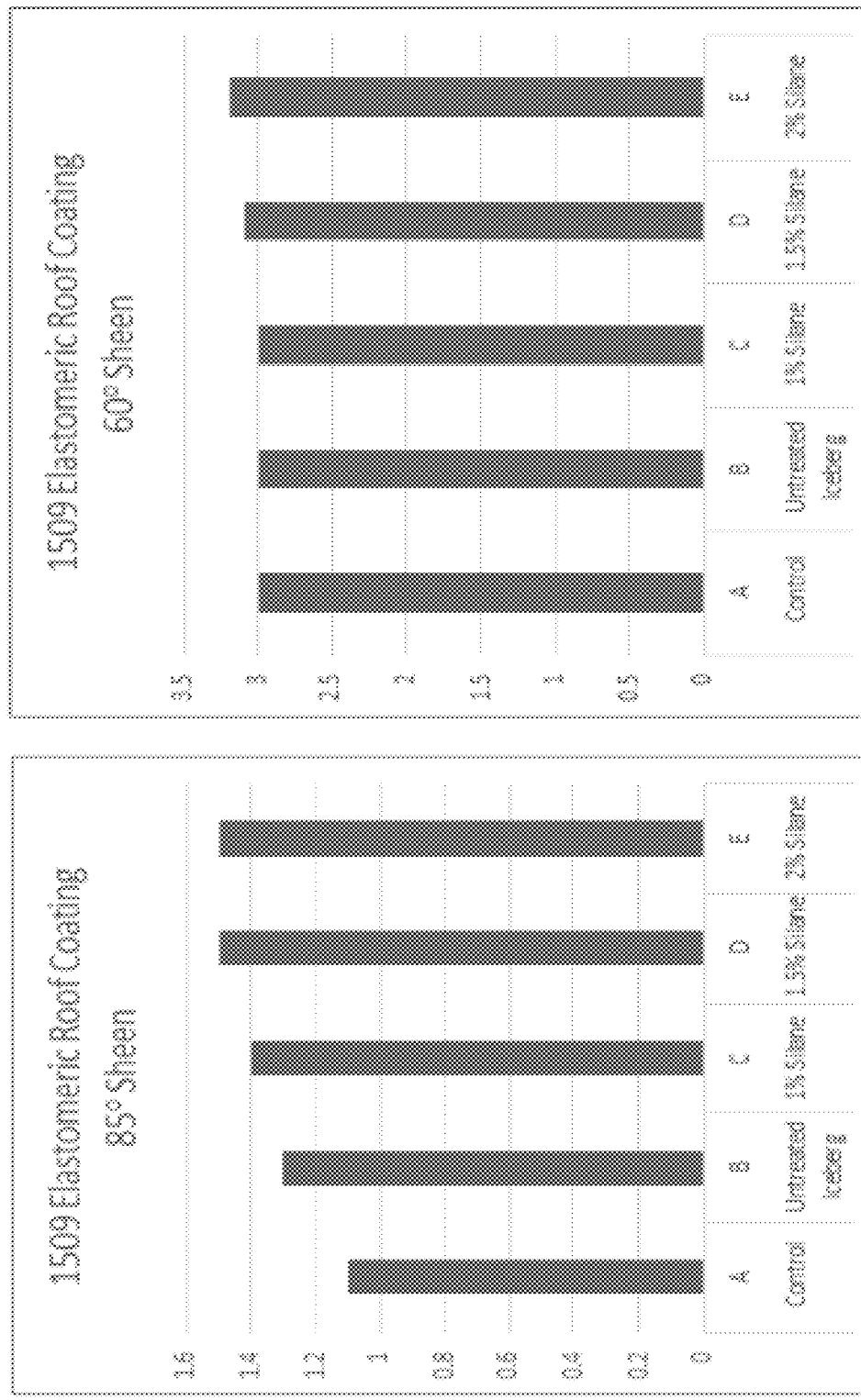
FIG. 30 shows a graphical comparison of 85% angular sheen for elastomeric roof coating formulations containing no kaolin, untreated anhydrous kaolin and various dosages of silane treated anhydrous kaolins.
FIG. 31 shows a graphical comparison of 60% angular sheen for elastomeric roof coating formulations containing no kaolin, untreated anhydrous kaolin and various dosages of silane treated anhydrous kaolins.

Referring now to FIGS. 22-25, compare the properties of silane treated anhydrous kaolin formulations with anhydrous kaolin formulations where silanes were added "in situ" after the kaolin had already been incorporated along with the other constituents into the paint composition for 67% PVC architectural flat paint formulations with ENCOR® 379G vinyl latex. These formulations where the silanes are introduced after the anhydrous kaolin already had been added to the paint formulation also are referred to herein as "post addition" silane formulations. FIG. 22 is chart that shows the various paint formulations that were compared as part of this study. Series 1 identifies the anhydrous kaolin formulations and dosages (1%, 1.5%, 2% and 2.5%) that were treated with OCTEO/AMEO silane blends. Series 2 identifies the kaolin formulations where (OCTEO/AMEO) silane blends were added to the formulation in situ in various comparable dosages (1%, 1.5%, 2% and 2.5%). Referring now to FIG. 23, it can be seen that while these post addition (in situ) silane formulations offered a slight improvement in abrasive scrub resistance, none of the paints demonstrated the same percent increase as the paints produced with silane treated kaolin. Referring now to FIGS. 24 and 25, it can be seen that unlike the silane treated kaolin, post addition of silanes offered no improvement in stain resistance and only trace improvement in water resistance as compared to untreated kaolin, and did not perform as well as the comparable silane treated kaolin in these areas.

Study of Silane Treated Anhydrous Kaolin as a Waterborne Elastomeric Roof Coating Silane treated anhydrous kaolin also was examined in a waterborne elastomeric roof coating. The formulation, shown in FIG. 26, was derived from a published starting formulation from Dow Chemical based on application of latex polymer RHOPLEX EC-1791. EC-1791 is considered a "workhorse" latex polymer in the roof coatings industry and was chosen to represent a standard commercially available product that would be applied to low slope roofs (rise ≤1", run ≤12"). Two controls are used in this study: Control formula (A) is representative of a standard roof coating formulation containing only $TiO_2$ and $CaCO_3$ (calcium carbonate). This is common practice as volume solids is typically targeted at 50%. Calcium carbonate is used in roof coatings, because it is a cost-effective filler with high brightness for good solar reflectivity. In the second control formula labeled (B), 100 parts of calcium carbonate is replaced with 100 parts untreated calcined kaolin. Then kaolin treated with the experimental OCTEO/AMEO silane blend 1% (C), 1.5% (D), and 2.0% (E) were incorporated at equal weight percent.

As can be seen in FIGS. 27-32, properties such as Contrast Ratio, Y Reflectance, Sheen, Water Absorption, Dirt Resistance, Elongation, Tensile Strength, and Modulus were tested and compared to the controls. Referring now to FIG. 27, it can be seen that Opacity, Y reflectance, lightness, sheen, and viscosity were similar with all paints tested. FIGS. 28-31 provide a graphical depiction of the optical properties of Opacity (FIG. 28), Y reflectance (FIG. 29) and sheen at 85° (FIG. 30) and 60° (FIG. 31) angles also are shown graphically.

Figures 32, 33:
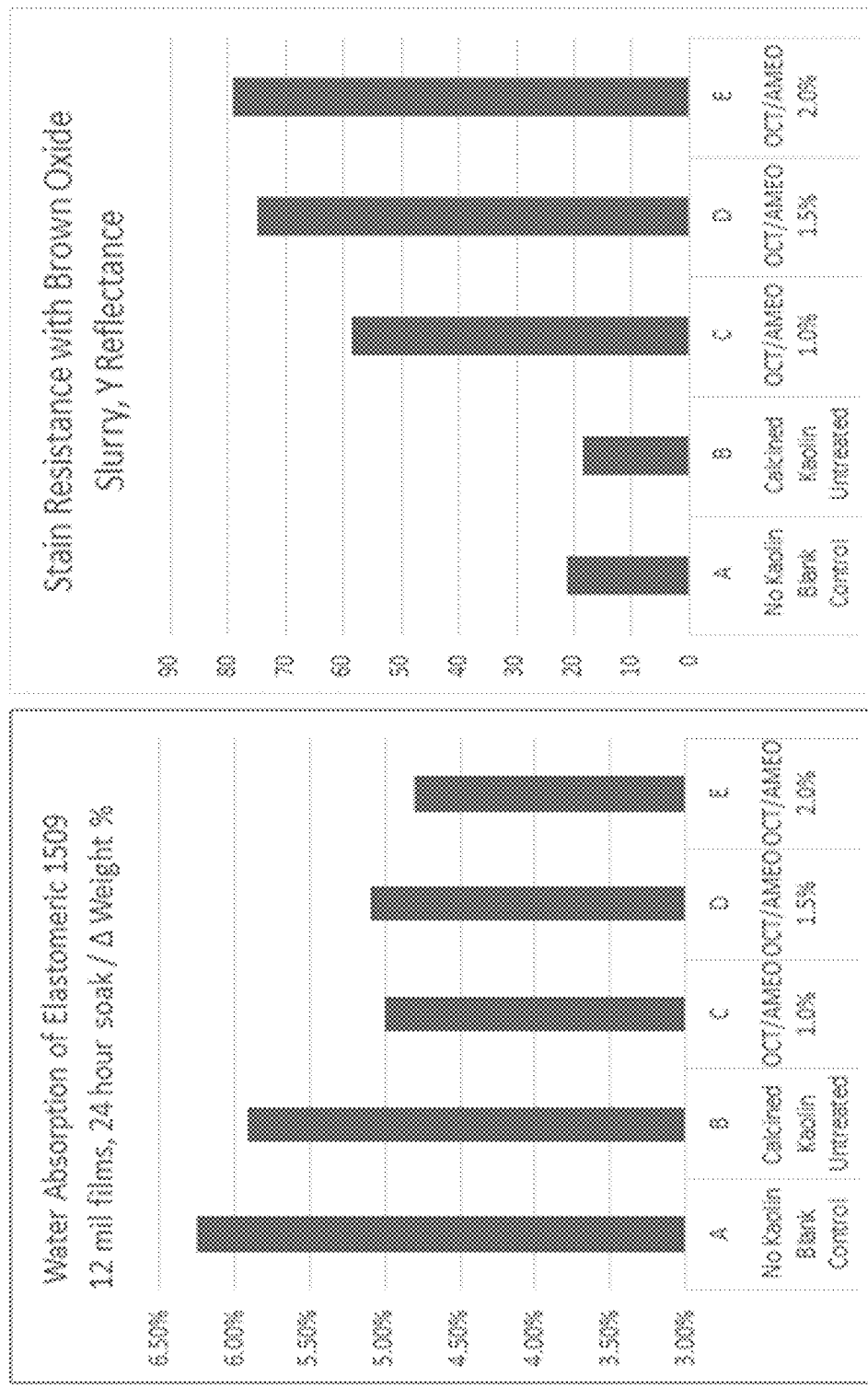
FIG. 32 shows a graphical comparison of water absorption for the elastomeric roof coating formulations containing no kaolin, untreated anhydrous kaolin and various dosages of silane treated anhydrous kaolins, 12 mil films, 24 hour soak.
FIG. 33 shows a graphical comparison of stain resistance with brown oxide slurry, Y-reflectance for the elastomeric roof coating formulations containing no kaolin, untreated anhydrous kaolin and various dosages of silane treated anhydrous kaolins.

Referring now to FIG. 32, it is seen that resistance to water absorption was best with the coatings containing treated kaolin (See FIG. 32). In this example, 12 mil films of the elastomeric coating formulations (A-E) soaked for 24 hours were compared. It can be seen that the formulations with no kaolin added (A) and with untreated calcined kaolin (B) took on the most water. The formulations (C-E) where calcined kaolin was treated with the OCTEO/AMEO silane blends introduced at 1.0%, 1.5% and 2.0% all exhibited less water absorption.

Referring now to FIG. 33, it is seen that stain resistance (soiling resistance) using brown oxide slurry was also best with films containing treated kaolin, and improved as the dosage level increased from 1%-2%.

Figure 34:
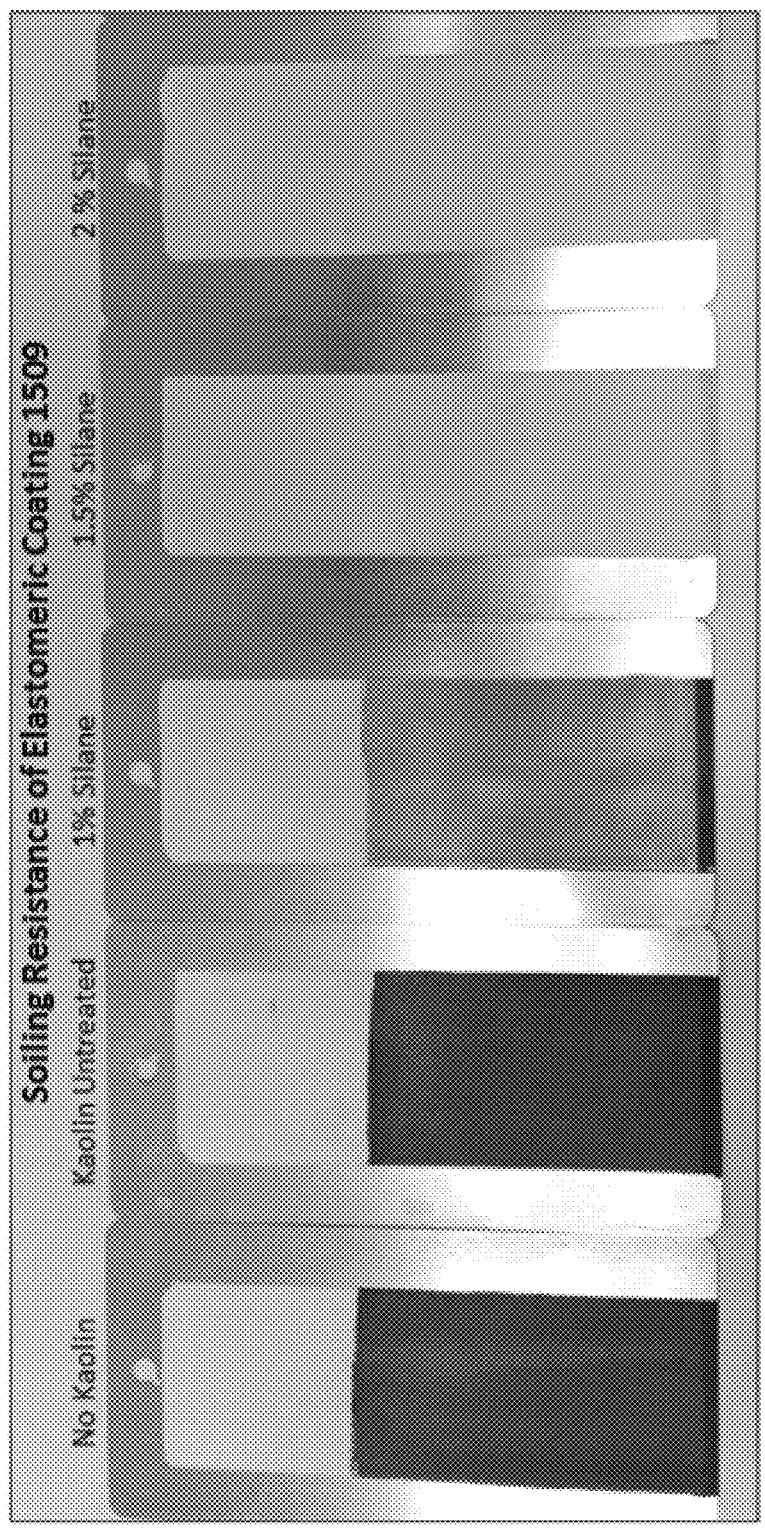
FIG. 34 shows the soiling resistance samples test results for the elastomeric roof coating formulations containing no kaolin, untreated anhydrous kaolin and various dosages of silane treated anhydrous kaolins, tested according to ASTM D 6083, 20 mil films.

As can be seen from FIG. 34, which shows the actual samples tested, the inclusion of the silane treated kaolin improves soiling resistance, with the 1.5% and 2.0% dosages showing almost no soiling, and the 1.0% showing improved soiling as compared to the no kaolin and untreated kaolin controls.

Figures 35, 36:
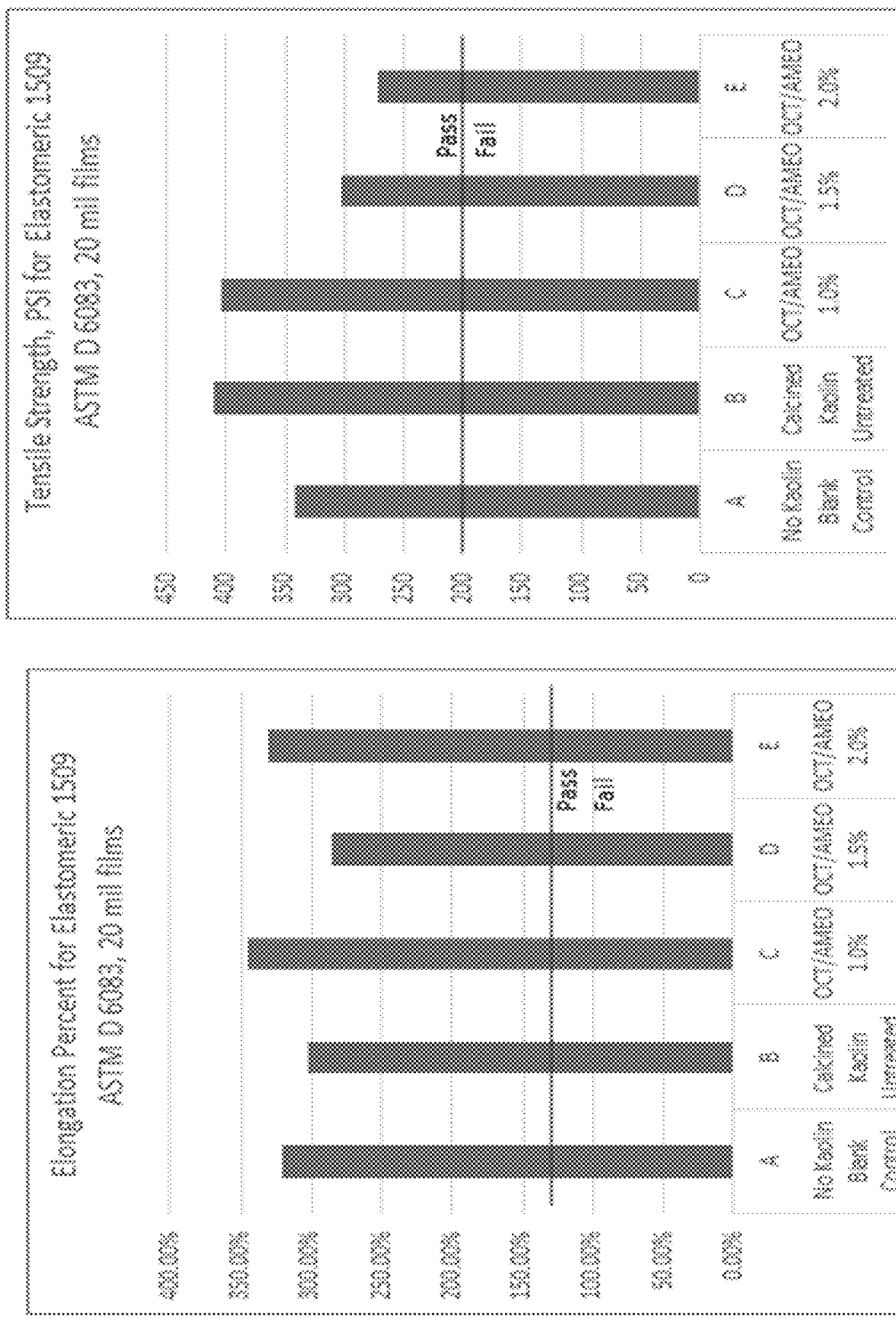
FIG. 35 shows a graphical comparison of percent elongation for the elastomeric roof coating formulations containing no kaolin, untreated anhydrous kaolin and various dosages of silane treated anhydrous kaolins tested according to ASTM D 6083, 20 mil films.
FIG. 36 shows a graphical comparison of tensile strength for the elastomeric roof coating formulations containing no kaolin, untreated anhydrous kaolin and various dosages of silane treated anhydrous kaolins tested according to ASTM D 6083, 20 mil films.
Figure 37:
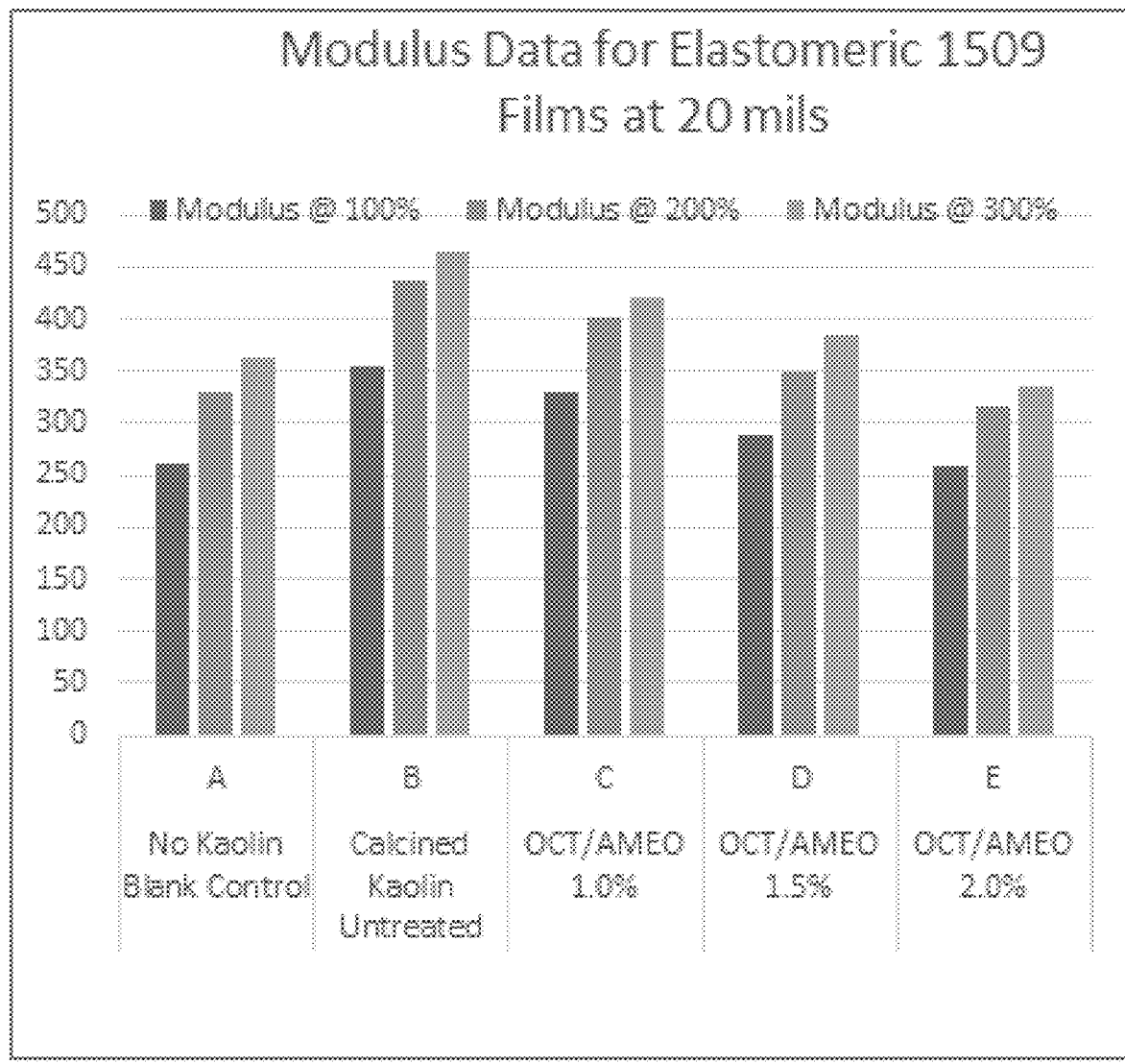
FIG. 37 shows a graphic comparison of elastic modulus data (at 100%, 200% and 300%) for the elastomeric roof coating formulations containing no kaolin, untreated anhydrous kaolin and various dosages of silane treated anhydrous kaolins for films at 20 mils.
Figures 40, 41:
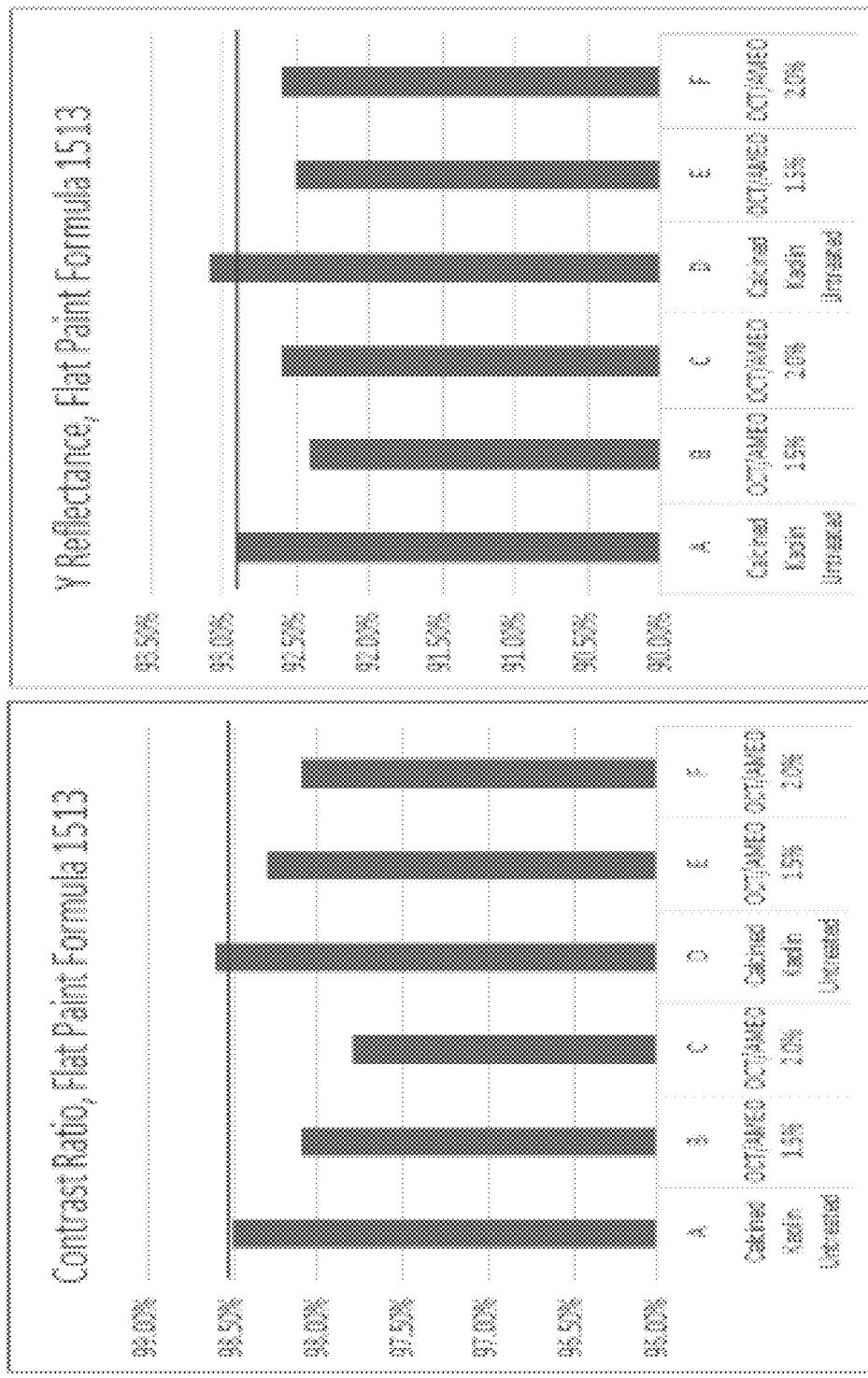
FIG. 40 shows a graphical comparison of opacity by contrast ratio for the paint formulations in which $TiO_2$ pigment loading is reduced by 20% through the addition of untreated anhydrous kaolin and silane treated anhydrous kaolin materials.
FIG. 41 shows a graphical comparison of treated kaolin Y reflectance for the paint formulations in which $TiO_2$ pigment loading is reduced by 20% through the addition of untreated anhydrous kaolin and silane treated anhydrous kaolin materials.

ASTM D6083 was used to determine pass/fail for elongation and tensile strength of films. FIG. 35 shows the results for both controls (samples A and B) and (OCTEO/AMEO) silane treated kaolin at 1%, 1.5%, and 2.0% (samples C-E), with the coatings being applied as 20 mil films. All of these remaining samples passed the minimum requirements of ASTM D6083 for elongation, tensile strength, and elastic modulus (when the material was stretched 100%, 200% and 300% of its original length) as shown in FIGS. 35-37, again with the coatings applied as 20 mil films. FIG. 35 shows a graphical comparison of percent elongation for the elastomeric roof coating formulations containing no kaolin, untreated anhydrous kaolin and various dosages of silane treated anhydrous kaolins tested according to ASTM D6083, 20 mil films. FIG. 36 shows a graphical comparison of tensile strength for the elastomeric roof coating formulations containing no kaolin, untreated anhydrous kaolin and various dosages of silane treated anhydrous kaolins tested according to ASTM D6083, 20 mil films. FIG. 37 shows a graphic comparison of elastic modulus data for the elastomeric roof coating formulations containing no kaolin, untreated anhydrous kaolin and various dosages of silane treated anhydrous kaolins for films at 20 mils stretched to 100%, 200% and 300% of its original length.

Study of Silane Treated Anhydrous Kaolin as a Pigment Extender

The use of silane treated anhydrous kaolin as a pigment extender, which can significantly reduce the cost of an architectural paint formulation, also was examined. Calcined kaolin is absorbent and therefore requires higher levels of dispersant for wetting, but it also tends to increase porosity of the film. As porosity increases, scrub resistance is decreased and stain resistance is diminished.

In this experiment, a high-quality paint formula was derived using standard calcined kaolin, $TiO_2$, and nepheline syenite. The formula was then adjusted for $TiO_2$ reduction using the untreated kaolin along with 1.5% silane treated kaolin. Here, $TiO_2$ is reduced by 20% and kaolin is increased by 50%. Film attributes were then tested including contrast ratio, reflectance, sheen, color, scrub resistance, and stain resistance. The objective was to meet quality control standards and maintain equal film performance of the control paint while reducing the amount of $TiO_2$ pigment.

Figure 42:
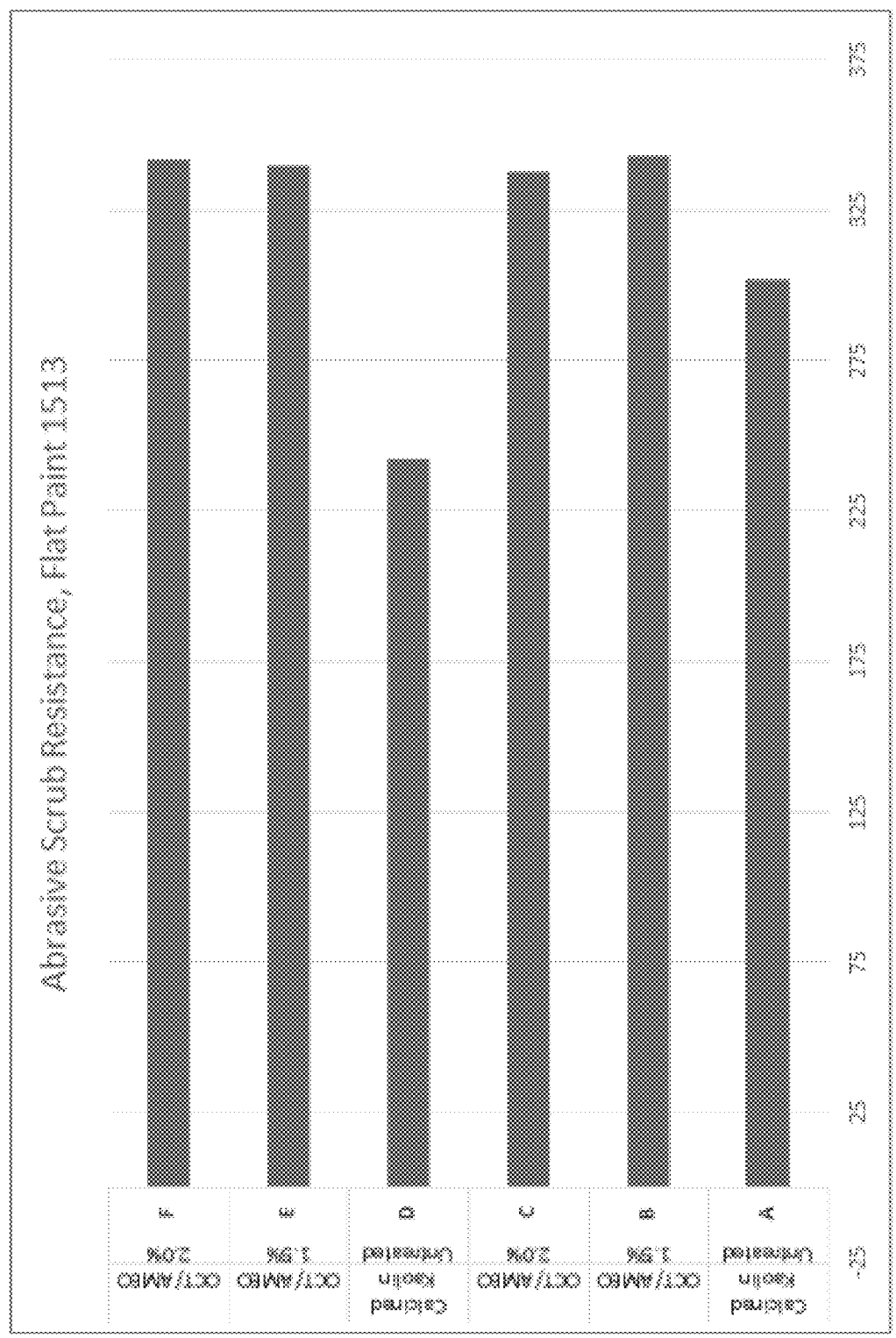
FIG. 42 shows a graphical comparison of abrasive scrub resistance ASTM D2486 for the paint formulations in which $TiO_2$ pigment loading is reduced by 20% through the addition of untreated anhydrous kaolin and silane treated anhydrous kaolin materials.
Figure 43:
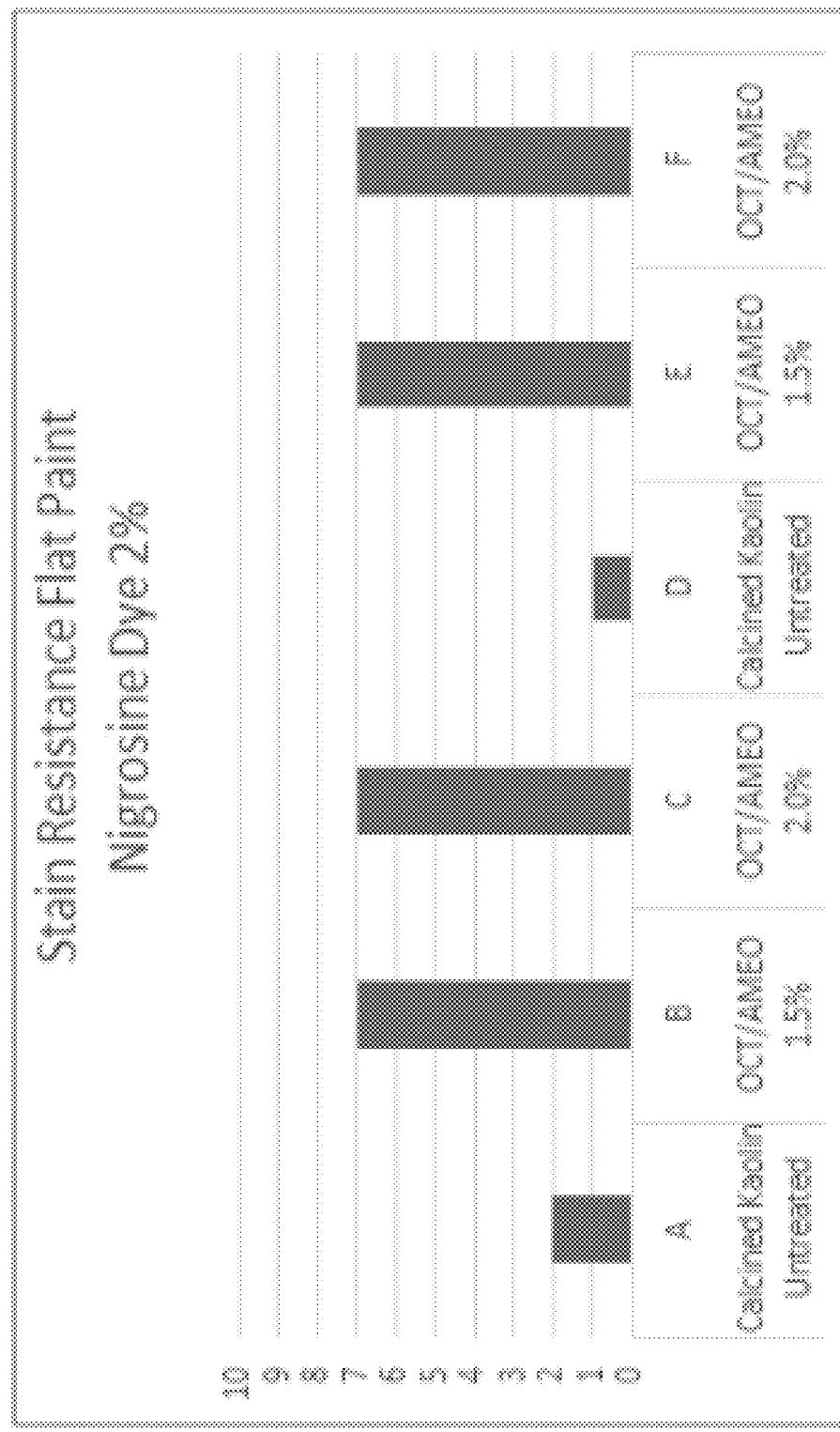
FIG. 43 shows a graphical comparison of nigrosine stain resistance of dry paint formulations for the paint formulations in which $TiO_2$ pigment loading is reduced by 20% through the addition of untreated anhydrous kaolin and silane treated anhydrous kaolin materials.

FIGS. 38-43 are directed to studies of a high performance architectural coating and the effects of adding untreated and silane treated kaolin on performance characteristics when $TiO_2$ pigment content is reduced. Referring now to FIG. 38, it is seen that the paint formula was derived using calcined kaolin, $TiO_2$ (Ti-Pure R-900) and nepheline syenite (Minex 4). Sample A contains untreated kaolin. Sample B contains kaolin treated with 1.5% silane (1.0% OCTEO and 0.50% AMEO). Sample C contains kaolin treated with 2% silane (1.33% OCTEO and 0.67% AMEO). Sample D contains untreated kaolin with 20% of the $TiO_2$ removed from the formulation. Sample D contains kaolin treated with 1.5% of a silane (1.0% OCTEO and 0.50% AMEO) with 20% of the $TiO_2$ removed from the formulation. Sample E contains kaolin treated with 2% silane (1.33% OCTEO and 0.67% AMEO) with 20% of the $TiO_2$ removed from the formulation. From FIGS. 39-41, it can be seen that reducing $TiO_2$ pigment content by 20% and adding silane treated kaolin in accordance with embodiments of this invention retained acceptable contrast ratio and Y-reflectance. As can be seen in FIGS. 42-43, when employing untreated kaolin to reduce $TiO_2$ content, properties such as scrub resistance and stain resistance deteriorated, whereas when using treated kaolin, all desired properties were maintained or exceeded.

Figures 46, 47:
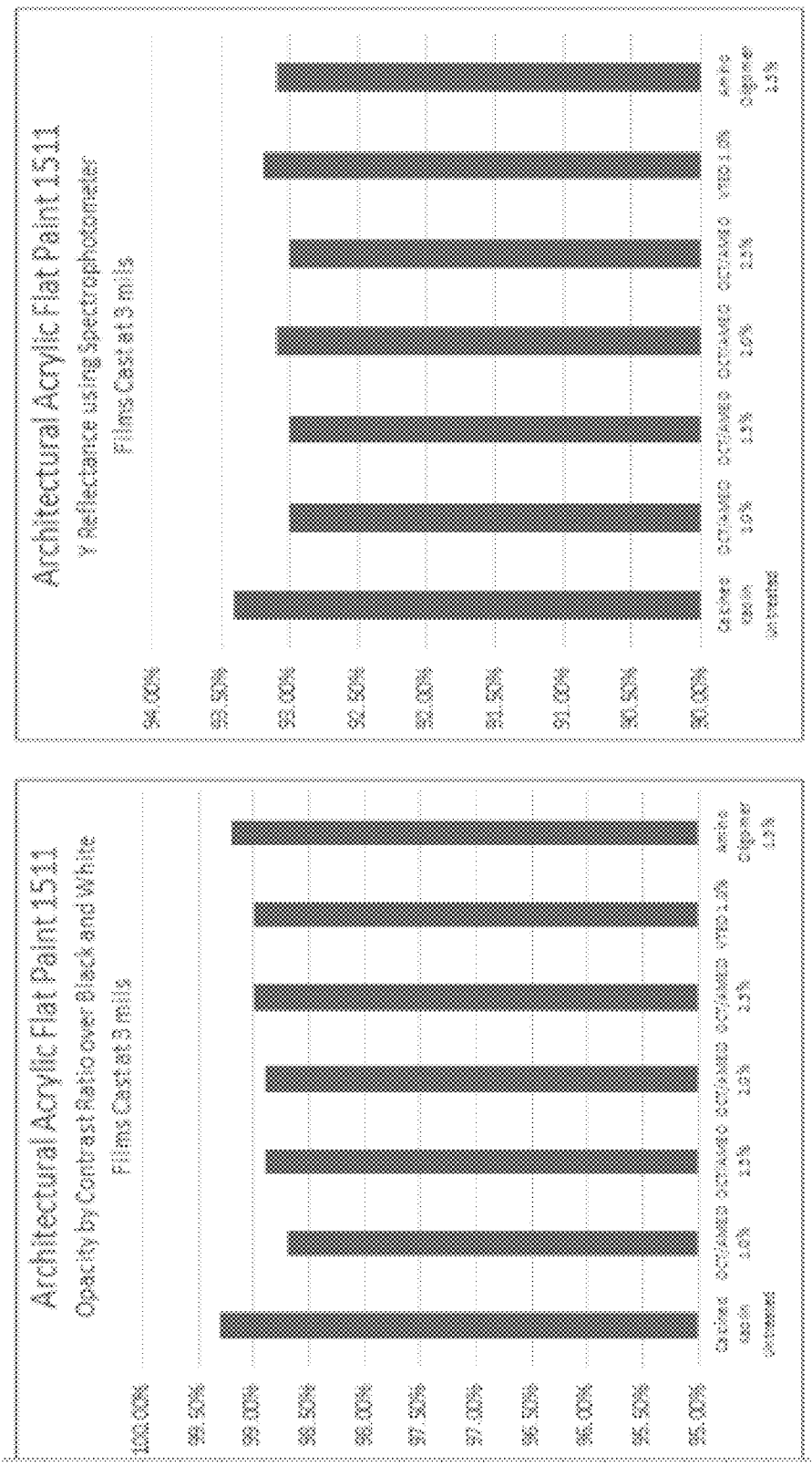
FIG. 46 shows a graphical comparison of opacity by contrast ratio over black and white for films cast at 3 mils for 63% PVC architectural acrylic flat paint formulations containing untreated anhydrous kaolin and various dosages of silane treated anhydrous kaolin.
FIG. 47 shows a graphical comparison of Y reflectance cast at 3 mils for 63% PVC architectural acrylic flat paint formulations containing untreated anhydrous kaolin and various dosages of silane treated anhydrous kaolin.
Figures 48, 49:
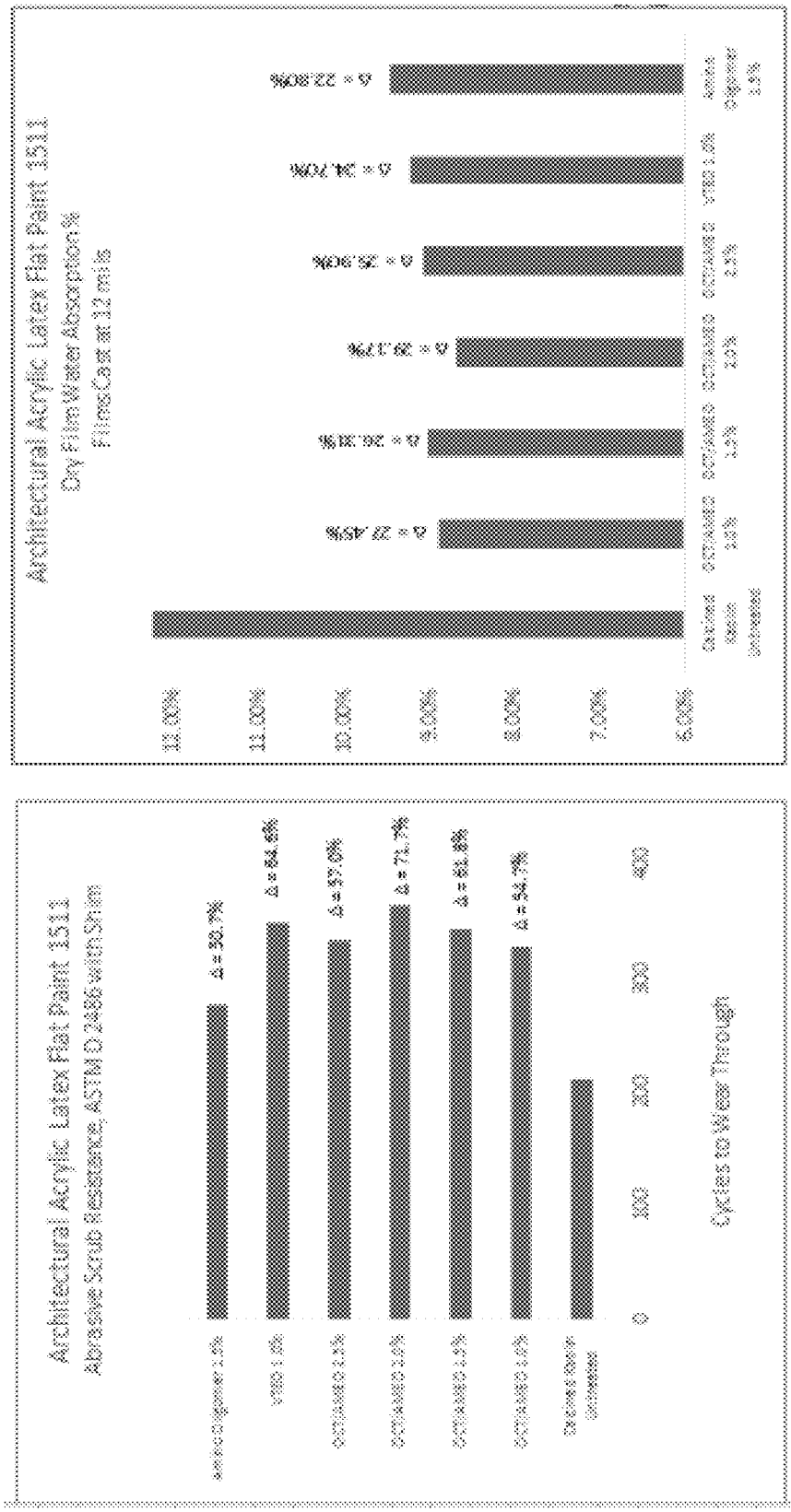
FIG. 48 shows a graphical comparison of the abrasive scrub resistance ASTM D2486 with shim cycles until failure for 63% PVC architectural acrylic flat paint formulations containing untreated anhydrous kaolin and various dosages of silane treated anhydrous kaolin.
FIG. 49 shows a graphical comparison of dry film water absorption percentage for 63% PVC architectural acrylic flat paint formulations containing untreated anhydrous kaolin and various dosages of silane treated anhydrous kaolin.
Figures 50, 51:
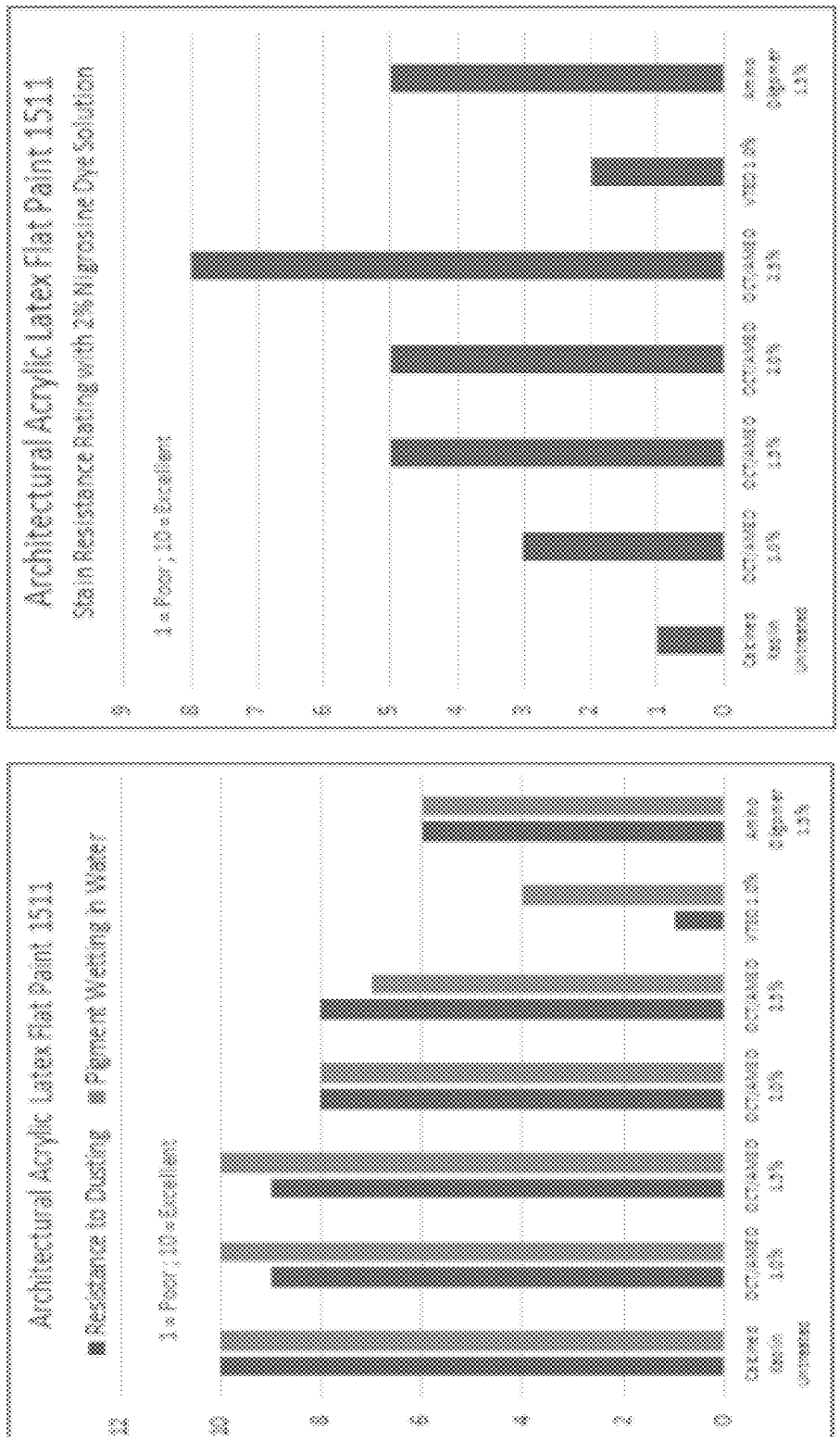
FIG. 50 shows a graphical comparison of resistance to dusting and pigment wetting in water for 63% PVC architectural acrylic flat paint formulations containing untreated anhydrous kaolin and various dosages of silane treated anhydrous kaolin.
FIG. 51 shows a graphical comparison of nigrosine stain resistance of dry paint formulations for the 63% PVC architectural acrylic flat paint formulations containing untreated anhydrous kaolin and various dosages of silane treated anhydrous kaolin.

FIGS. 44-51 are directed to studies of 63% PVC architectural flat acrylic paint formulations that are representative of a typical commercial waterborne coating. First, a control formula was prepared using the untreated calcined kaolin, then treated controls were prepared using 1% (0.67% OCTEO/0.33% AMEO), 1.5% (1.0% OCTEO/0.5% AMEO), 2% (1.34% OCTEO/0.66% AMEO) and 2.5% (1.67% OCTEO/0.83% AMEO), 1.0% VTEO (vinyl triethoxy silane) and 1.5% amino functional oligomer silane. The treated experimental silane blends of OCTEO and AMEO were then compounded into the formulation where attributes were compared to both treated and untreated controls for incorporation, dusting, and film performance. All kaolin samples were evaluated at equal weight percent. Referring now to FIGS. 46 and 47, opacity and brightness were determined using contrast ratio and Y reflectance measurements. Compared to the untreated control, these values were minimally reduced in paints produced with treated kaolin, but varied little between the different surface treatments. Referring now to FIG. 48, it is seen that abrasive scrub resistance was substantially improved with all treated test subjects. Referring now to FIG. 49, it is seen that reduction in water uptake (absorption) of dry paint films containing treated kaolin was reduced between 22.8%-29.17%, with silane blended surface treatments in accordance with embodiments of the present invention (OCTEO/AMEO 1.0%-2.5%) displaying the best hydrophobicity. Similarly, referring now to FIG. 50 it is seen that resistance to dusting and ease of pigment wetting was best with inventive silane treatments, followed by amino oligomeric treatment and VTEO displaying the worst properties. Referring now to FIG. 51, stain resistance was improved with all treated samples, where the best performance was seen with the 2.5% OCTEO/AMEO silane sample and the least with the 1.0% VTEO sample.

Figure 52:
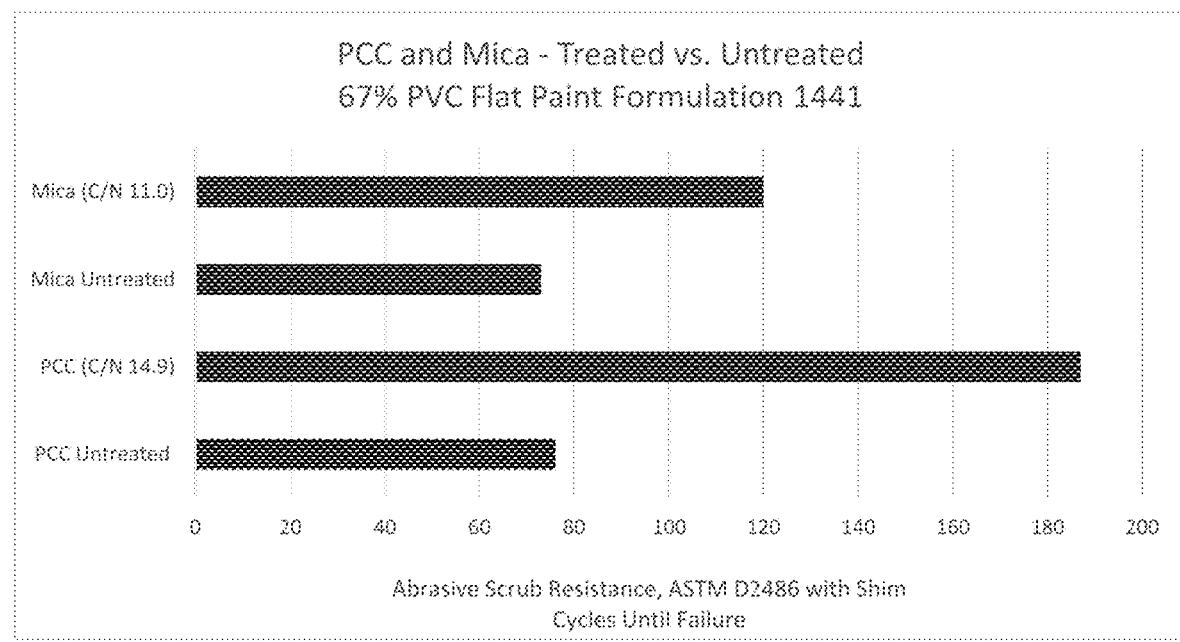
FIG. 52 shows a graphical comparison of abrasive scrub resistance ASTM D2486 with shim cycles until failure for 67% PVC flat paint formulations for silane treated PCC and Mica as compared to untreated formulations.
Figure 53:
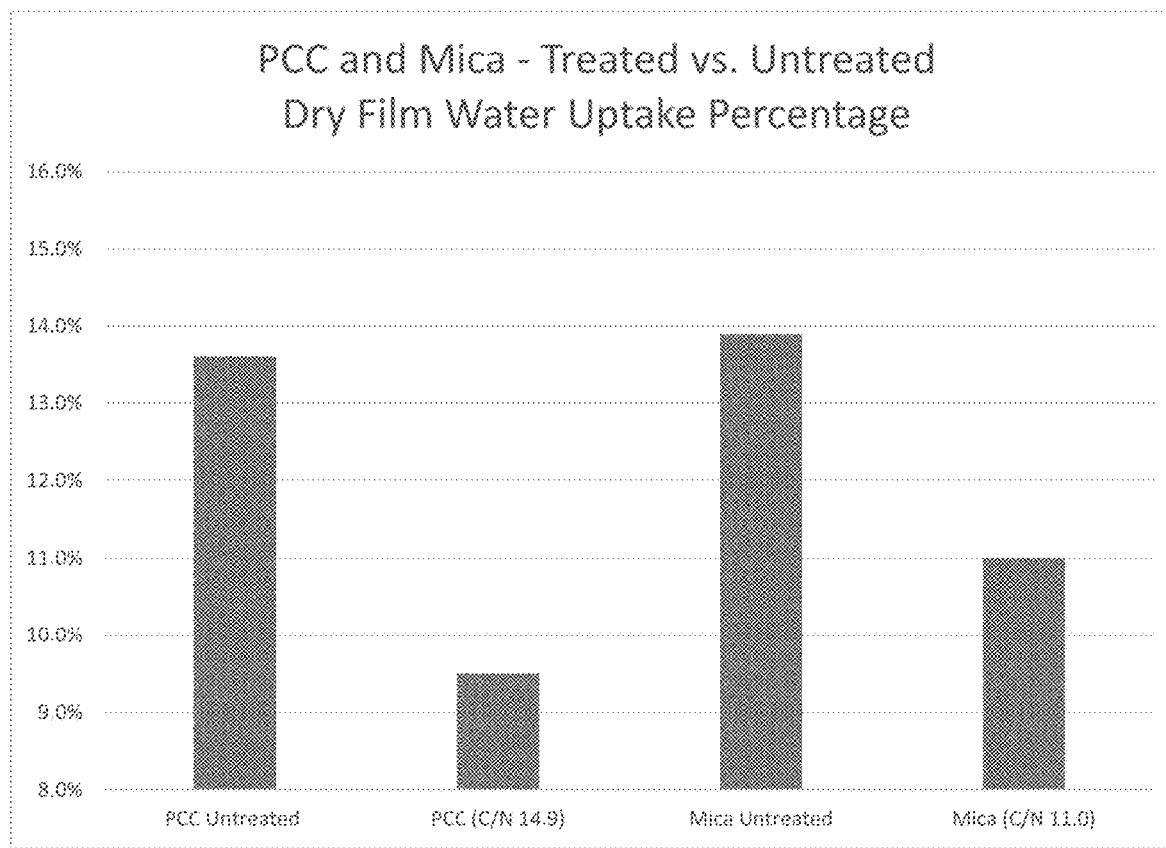
FIG. 53 shows a graphical comparison of dry film water uptake percentage for silane treated PCC and Mica as compared to untreated formulations.
Figure 54:
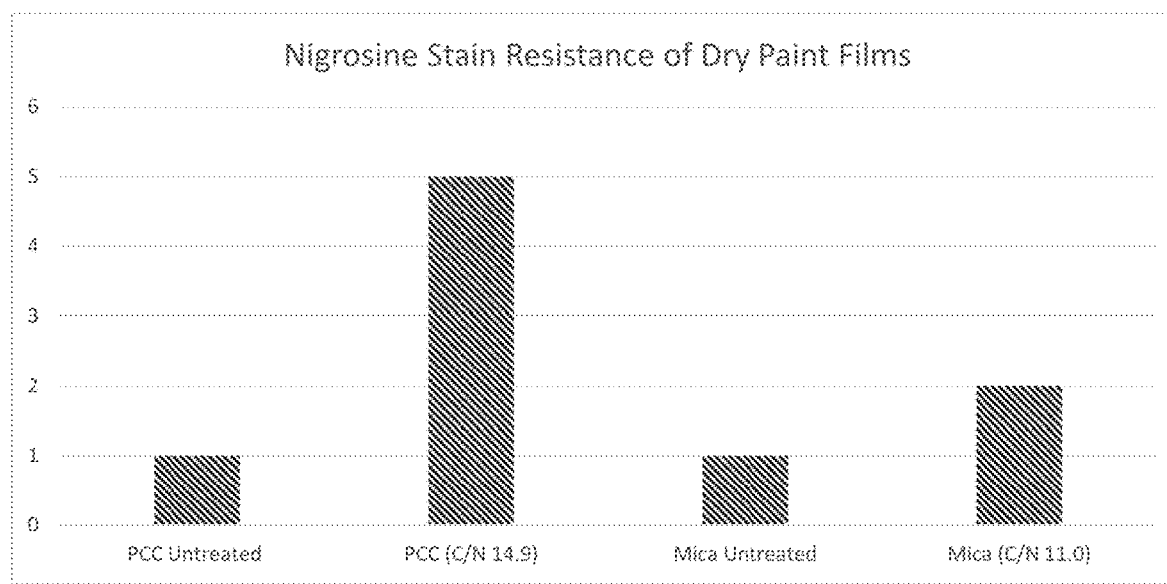
FIG. 54 shows a graphical comparison of nigrosine stain resistance of dry paint films for silane treated PCC and Mica as compared to untreated formulations.

FIGS. 52-54 show a comparison of 67% PVC flat paints produced with silane treated and untreated precipitated calcium carbonate (PCC) and silane treated and untreated mica. Similar to the silane treatments of anhydrous kaolin, the silane treatments within the C/N ratio ranges of 9 to 18 of PCC and mica helped to improve certain paint properties. Referring now to FIG. 52, it can be seen that the silane treated PCC sample with a C/N ratio of 15 exhibited improved abrasive scrub resistance (ASTM D 2486) with over 180 shim cycles until failure as compared with untreated PCC, which exhibited abrasive scrub resistance of under 80 shim cycles until failure. The silane treated mica sample, with a C/N ratio of 11 also showed improvement as compared to the untreated sample, with the silane treated mica exhibiting an abrasive scrub resistance of around 120 shim cycles until failure. The untreated mica sample exhibited under 80 shim cycles until failure. Referring now to FIG. 53, it can be seen that resistance to dry film water uptake also improved with the silane treated minerals with C/N ratios in the 9 to 18 range. For example, the sample silane treated PCC sample with a C/N ratio of 15 exhibited dry film water uptake of less than 10%. Whereas the untreated PCC sample exhibited dry film water uptake of over 13%. The silane treated mica sample with a C/N ratio of 11 exhibited dry film water uptake of around 11%, whereas the untreated mica sample exhibited dry film water uptake of just under 14%. Referring now to FIG. 54, it can be nigrosine stain resistance of dry paint films also improved with the silane treated minerals. For example, the silane treated PCC sample with a C/N ratio of 15 had a nigrosine stain resistance score of 5, whereas the untreated PCC sample had a score of 1. The silane treated mica sample had a nigrosine stain resistance score of 2, whereas the untreated mica sample had a score of 1.

From the foregoing, it will be understood that numerous modifications and variations can be effectuated without departing from the true spirit and scope of the novel concepts of the present invention. It is to be understood that no limitation with respect to the specific embodiments illustrated and described is intended or should be inferred.

We claim:

1. A coating comprising:
   a binder and a coating additive comprising an anhydrous kaolin;
   wherein the anhydrous kaolin has been chemically modified with a stable blend of alkylalkoxy and primary aminoalkylalkoxy silanes with the stable blend having a cured carbon to nitrogen ratio (C/N) of 9 to 18;
   wherein the anhydrous kaolin is rendered amphipathic; and
   wherein the coating is a water based latex paint.

2. The coating of claim 1, wherein the C/N ratio is 9.

3. The coating of claim 1, wherein the C/N ratio is 11.

4. The coating of claim 1, wherein the C/N ratio is 13.

5. The coating of claim 1, wherein the C/N ratio is 18.

6. The coating of claim 1, wherein the blend comprises a blend of alkyltrialkoxy silane and a primary aminoalkyltrialkoxy silane.

7. The coating of claim 1, wherein the blend comprises a blend of octyltriethoxysilane and aminopropyltriethoxysilane.

8. The coating of claim 1, wherein the kaolin is modified with the blend in a concentration of about 1% to about 5%.

9. The coating of claim 1, wherein the kaolin is modified with the blend in a concentration of about 1% to about 2.5%.

10. The coating of claim 1, wherein the kaolin is modified with the blend in a concentration of about 1.0%.

11. The coating of claim 1, wherein the kaolin is modified with the blend in a concentration of about 1.5%.

12. The coating of claim 1, wherein the kaolin is modified with the blend in a concentration of about 2.0%.

13. The coating of claim 1, wherein the kaolin is modified with the blend in a concentration of about 2.5%.

14. The coating of claim 1, wherein the kaolin has a density of about 2.2 g/cc to about 2.6 g/cc, and has an average particle diameter of about 0.1 μm to about 5.0 μm.

15. The coating of claim 1, wherein the chemically modified kaolin is a pigment.

16. The coating of claim 15, wherein the chemically modified kaolin is interspersed with a second pigment.

17. The coating of claim 1, wherein the coating is an adhesive coating.

* * * * *

UNITED STATES PATENT AND TRADEMARK OFFICE
CERTIFICATE OF CORRECTION

| | |
|---|---|
| PATENT NO. | : 12,012,524 B2 |
| APPLICATION NO. | : 16/144109 |
| DATED | : June 18, 2024 |
| INVENTOR(S) | : George L. Blossom and Ben H. York |

It is certified that error appears in the above-identified patent and that said Letters Patent is hereby corrected as shown below:

In the Specification

In Column 4, Line 5, where the phrase "particle size of 0.1-5.0." should be replaced with "particle size of 0.1-5.0 μm.".

In Column 4, Line 37, where the phrase "particle size of 0.1-5.0." should be replaced with "particle size of 0.1-5.0 μm.".

In Column 4, Line 59, where the phrase "particle size of 0.1-5.0." should be replaced with "particle size of 0.1-5.0 μm.".

In Column 8, Line 41, where the phrase "Al2O3.2SiO2.2H2O" should be replaced with "Al2O3 • 2SiO2 • 2H2O".

In Column 13, Line 60, where the phrase "so Cured Carbon" should be replaced with "so % Cured Carbon".

In Column 13, Line 62, where the phrase "so Cured Nitrogen" should be replaced with "so % Cured Nitrogen".

Signed and Sealed this
Thirtieth Day of July, 2024

*Katherine Kelly Vidal*

Katherine Kelly Vidal
*Director of the United States Patent and Trademark Office*